United States Patent
Kimura

(10) Patent No.: US 11,489,422 B2
(45) Date of Patent: Nov. 1, 2022

(54) ARMATURE MANUFACTURING METHOD AND ARMATURE

(71) Applicant: AISIN CORPORATION, Kariya (JP)

(72) Inventor: Hideaki Kimura, Okazaki (JP)

(73) Assignee: AISIN CORPORATION, Kariya (JP)

( * ) Notice: Subject to any disclaimer, the term of this patent is extended or adjusted under 35 U.S.C. 154(b) by 134 days.

(21) Appl. No.: 16/960,621

(22) PCT Filed: Feb. 28, 2019

(86) PCT No.: PCT/JP2019/007815
§ 371 (c)(1),
(2) Date: Jul. 8, 2020

(87) PCT Pub. No.: WO2019/168100
PCT Pub. Date: Sep. 6, 2019

(65) Prior Publication Data
US 2020/0366171 A1 Nov. 19, 2020

(30) Foreign Application Priority Data
Mar. 1, 2018 (JP) .............................. JP2018-036285

(51) Int. Cl.
*H02K 15/06* (2006.01)
*H02K 3/34* (2006.01)
(Continued)

(52) U.S. Cl.
CPC ............ *H02K 15/065* (2013.01); *H02K 3/34* (2013.01); *H02K 3/48* (2013.01); *H02K 15/105* (2013.01)

(58) Field of Classification Search
CPC ........ H02K 15/065; H02K 15/12; H02K 3/50; H02K 15/105; H02K 3/34; H02K 3/48
See application file for complete search history.

(56) References Cited

U.S. PATENT DOCUMENTS 8,063,518 B2 * 11/2011 Asai ...................... H02K 3/325
310/43
9,837,882 B2 * 12/2017 Nakano ................ H02K 15/105
(Continued)

FOREIGN PATENT DOCUMENTS

CN    101569079 A    10/2009
EP      1020976 A2     7/2000
(Continued)

OTHER PUBLICATIONS

International Search Report for PCT/JP2019/007815 dated May 28, 2019 (PCT/ISA/210).
(Continued)

*Primary Examiner* — Leda T Pham
(74) *Attorney, Agent, or Firm* — Sughrue Mion, PLLC

(57) ABSTRACT

A method for manufacturing an armature (1) includes: a coil disposing step involving using a thermally expandable resin (Q) that expands by application of heat, and disposing a coil (30) in a core (10) such that the thermally expandable resin (Q) before expansion is disposed between a slot-housed portion (31) and an inner surface of a slot (11); a resin disposing step involving, before or after the coil disposing step, using a thermally melting resin (P) that melts by application of heat, and disposing the thermally melting resin (P) before melting such that the thermally melting resin (P) comes into contact with coil end portions (32); and a heating step involving, after the coil disposing step and the resin disposing step, heating, expanding, and then curing the thermally expandable resin (Q), and heating, melting, and then curing the thermally melting resin (P).

17 Claims, 15 Drawing Sheets

(51) Int. Cl.
  *H02K 3/48* (2006.01)
  *H02K 15/10* (2006.01)

(56) References Cited

U.S. PATENT DOCUMENTS

| | | | | |
|---|---|---|---|---|
| 2002/0089250 | A1* | 7/2002 | Naka | H02K 3/345 |
| | | | | 310/215 |
| 2005/0275296 | A1 | 12/2005 | Kumakura et al. | |
| 2009/0302694 | A1 | 12/2009 | Asai | |
| 2010/0107401 | A1* | 5/2010 | Suzuki | H02K 15/12 |
| | | | | 29/596 |
| 2010/0244615 | A1* | 9/2010 | Kouda | H02K 3/345 |
| | | | | 310/215 |
| 2011/0163620 | A1 | 7/2011 | Nakamura | |
| 2016/0118869 | A1 | 4/2016 | Nakano et al. | |

FOREIGN PATENT DOCUMENTS

| | | |
|---|---|---|
| JP | S57-1202 A | 1/1982 |
| JP | 2012-228093 A | 11/2012 |
| JP | 2013-009499 A | 1/2013 |
| JP | 2017-200356 A | 11/2017 |

OTHER PUBLICATIONS

Communication dated Feb. 22, 2021, from the European Patent Office in application No. 19760351.7.

* cited by examiner

ARMATURE MANUFACTURING METHOD AND ARMATURE

CROSS REFERENCE TO RELATED APPLICATIONS

This application is a National Stage of International Application No. PCT/JP2019/007815 filed Feb. 28, 2019, claiming priority based on Japanese Patent Application No. 2018-036285 filed Mar. 1, 2018 the contents of which are incorporated in their entirety.

TECHNICAL FIELD

The present disclosure relates to methods for manufacturing armatures including cores provided with slots and coils provided with slot-housed portions disposed inside the slots and coil end portions disposed outside the slots, and to such armatures.

BACKGROUND ART

In regard to a rotary electric machine manufacturing method, Japanese Unexamined Patent Application Publication No. 2016-17079 (JP 2016-17079 A), which will be referred to as "Patent Document 1", discloses a technique to fix a coil using a thermosetting resin composite sheet. Specifically, Patent Document 1 discloses a technique that involves heating an entirety of a stator, with the thermosetting resin composite sheet placed on a coil end, fluidizing the sheet, and then curing the fluidized sheet, thus fixing the coil (see, for example, Paragraphs [0011] and [0012] and FIG. 2).

RELATED ART DOCUMENTS

Patent Documents

Patent Document 1: Japanese Unexamined Patent Application Publication No. 2016-17079 (JP 2016-17079 A)

SUMMARY OF THE DISCLOSURE

Problem to be Solved by the Disclosure

It is, however, not easy to control the state of thermosetting resin composite penetration into a slot, with the thermosetting resin composite sheet (which is placed on the coil end) fluidized. Thus, the technique disclosed in Patent Document 1 is able to fix conductors (i.e., coil end portions), which define the coil end, to each other but has difficulty in fixing a slot-housed portion to the core.

What is desired now is a technique that makes it possible to, with a relatively simple step, not only fix a slot-housed portion to a core but also fix coil end portions (which define a coil end) to each other.

Means for Solving the Problem

In view of the above circumstances, a method for manufacturing an armature including a core that includes a slot and a coil that includes a slot-housed portion disposed inside the slot and coil end portions disposed outside the slot is characterized by including: a coil disposing step involving using a thermally expandable resin that expands by application of heat, and disposing the coil in the core such that the thermally expandable resin before expansion is disposed between the slot-housed portion and an inner surface of the slot; a resin disposing step involving, before or after the coil disposing step, using a thermally melting resin that melts by application of heat, and disposing the thermally melting resin before melting such that the thermally melting resin comes into contact with the coil end portions; and a heating step involving, after the coil disposing step and the resin disposing step, heating, expanding, and then curing the thermally expandable resin, and heating, melting, and then curing the thermally melting resin.

The above method involves performing the heating step so as to expand the pre-expansion thermally expandable resin disposed between the slot-housed portion and the inner surface of the slot and then cure the thermally expandable resin. This makes it possible to fix the slot-housed portion to the inner surface of the slot with the thermally expandable resin that has expanded (that has cured after expansion). The method involves performing the heating step so as to melt the pre-melting thermally melting resin disposed in contact with the coil end portions and then cure the thermally melting resin. This makes it possible to cause the molten thermally melting resin to flow into gaps between the coil end portions that define a coil end. The coil end portions are thus fixable to each other with the thermally melting resin that has molten (that has cured after melting). In other words, performing the heating step makes it possible to not only fix the slot-housed portion to the core but also fix the coil end portions (which define the coil end) to each other.

The above method is thus able to, with a relatively simple step, not only fix the slot-housed portion to the core but also fix the coil end portions (which define the coil end) to each other.

In view of the above circumstances, an armature including a core that includes a slot and a coil that includes a slot-housed portion disposed inside the slot and coil end portions disposed outside the slot is characterized in that a thermally expandable resin that expands by application of heat is disposed between the slot-housed portion and an inner surface of the slot, with the thermally expandable resin cured after expansion, and in that a thermally melting resin that melts by application of heat is disposed in a gap between the coil end portions, with the thermally melting resin cured after melting.

In the above arrangement, the slot-housed portion is fixed to the core, and in addition, the coil end portions that define a coil end are fixed to each other. This makes it possible to provide the armature that is able to reduce vibrations of the coil end.

In the above arrangement, a resin whose reaction until curing progresses by application of heat is usable as both of the thermally expandable resin to fix the slot-housed portion to the core and the thermally melting resin to fix the coil end portions to each other. This makes it possible to perform both of the step of fixing the slot-housed portion to the core and the step of fixing the coil end portions to each other in the same step (i.e., the heating step) in the course of manufacture of the armature. Consequently, the armature is manufacturable by fixing the slot-housed portion to the core and fixing the coil end portions (which define the coil end) to each other by a relatively simple step.

Further features and advantages of the armature manufacturing method and the armature will be apparent from the following description of embodiments with reference to the drawings.

DETAILED DESCRIPTION

First Embodiment

Figure 1:
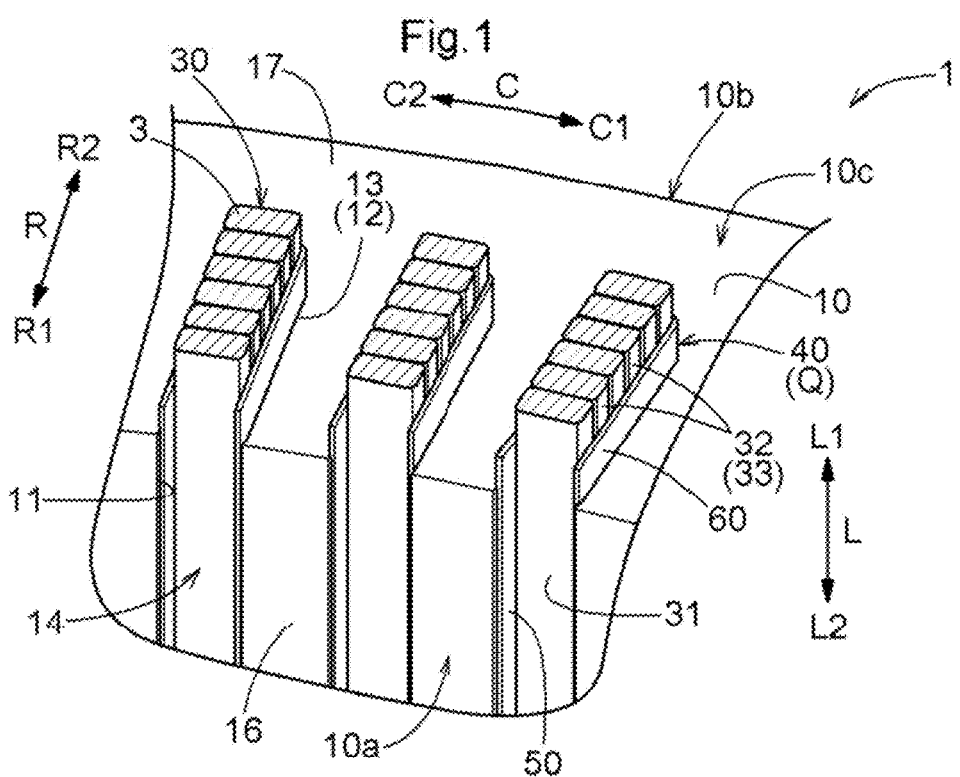
FIG. 1 is a perspective view of a portion of an armature.

An armature manufacturing method and an armature according to a first embodiment will be described with reference to the drawings (FIGS. 1 to 19). In the present embodiment, a first heating step S31 is equivalent to a "heating step", and each insulating sheet 40 is equivalent to a "sheet member". In the following description, directions for the insulating sheets 40 are directions defined, with the insulating sheets 40 placed in a core 10 (e.g., with the insulating sheets 40 fitted to the core 10), and directions for a coil 30 are directions defined, with the coil 30 placed in the core 10 (e.g., with the coil 30 wound around the core 10).

As used herein, the term "shape of a component extending in a direction" is not limited to, assuming that this direction is a reference direction, a shape of a component extending in parallel to the reference direction but conceptually includes a shape of a component extending in a direction intersecting the reference direction as long as an angle of the intersection falls within a predetermined range (e.g., below 30 degrees or below 45 degrees). As used herein, the term "rotary electric machine" conceptually includes any of a motor (e.g., an electric motor), a generator (e.g., a power generator), and a motor generator that functions as both of a motor and a generator when necessary. As used herein, terms related to, for example, dimensions, arrangement directions, and arrangement locations (such as "parallel to") conceptually include a state where there is a difference resulting from an error (e.g., an allowable error in the course of manufacture).

Figure 2:
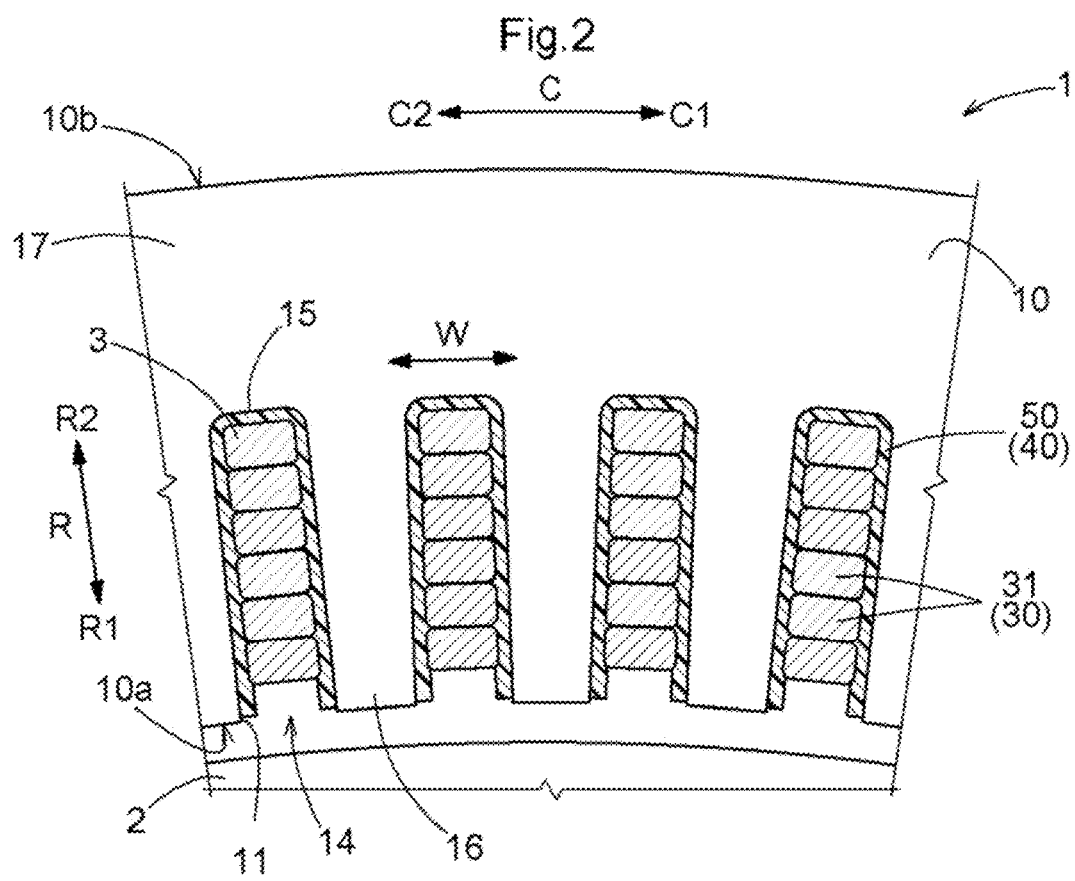
FIG. 2 is a cross-sectional view of a portion of the armature taken in a direction perpendicular to an axial direction.

As illustrated in FIGS. 1 and 2, an armature 1 includes: the core 10 that includes slots 11; the coil 30 wound around the core 10; and the insulating sheets 40 that electrically insulate the core 10 and the coil 30 from each other. For the sake of simplicity, FIG. 1 illustrates the coil 30 in a state where portions of the coil 30 protruding out of the slots 11 are cut off. The armature 1 is structured to produce a shifting magnetic field to move a field magnet 2 (see FIG. 2) relative to the armature 1. The field magnet 2 includes, for example, a permanent magnet and/or an electromagnet. Specifically, supplying AC power to the coil 30 causes the armature 1 to form a shifting magnetic field that moves in the arrangement direction of the slots 11 (i.e., the arrangement direction of teeth 16 each provided between two adjacent ones of the slots 11), and causes the field magnet 2 to move relative to the armature 1 in the direction of movement of the shifting magnetic field.

As illustrated in FIGS. 1 and 2, the armature 1 according to the present embodiment is an armature for a rotary electric machine. With AC power supplied to the coil 30, the armature 1 forms a shifting magnetic field (i.e., a revolving magnetic field) that moves in a circumferential direction C. Specifically, the armature 1 is an armature for a revolving field type rotary electric machine. Accordingly, the armature 1 is a stator fixed to a non-rotational member, such as a case, and the field magnet 2 is a rotor that rotates owing to a revolving magnetic field formed by the armature 1. The armature 1 may be an armature for a fixed field type (revolving armature type) rotary electric machine. The armature 1 may be an armature to be used for a motor, such as a linear motor. In other words, the armature 1 may be an armature that forms a shifting magnetic field that moves linearly.

As illustrated in FIGS. 1 and 2, a rotary electric machine for which the armature 1 according to the present embodiment is to be used is a radial gap type rotary electric machine. Thus, the core 10 has a cylindrical shape (is cylindrical as a whole), with the slots 11 disposed in the circumferential direction C. Ends of each slot 11 that face in an axial direction L are provided with openings (i.e., axial openings 12). In the present embodiment, each axial opening 12 is equivalent to an "opening of a slot". In the present embodiment, the circumferential direction C is equivalent to an "arrangement direction" (which is a direction in which the slots in the core are arranged). The slots 11 are formed to extend in the axial direction L and pass through the core 10 in the axial direction L. In the present embodiment, the slots 11 are formed to extend in parallel to the axial direction L. Alternatively, the armature 1 may be an armature to be used for an axial gap type rotary electric machine. In this case, ends of each slot 11 that face in a radial direction R are provided with openings (i.e., radial openings). Each radial opening is equivalent to an "opening of a slot".

As illustrated in FIGS. 1 and 2, an end of each slot 11 in a region adjacent to the field magnet 2 in the radial direction R is provided with an opening (i.e., a radial opening 14). The region adjacent to the field magnet 2 in the radial direction R will hereinafter be referred to as a "field magnet side". In the present embodiment, a rotary electric machine for which the armature 1 is to be used is an inner rotor type rotary electric machine. Thus, a radially inward side R1 (i.e., an inward side in the radial direction R) is the field magnet side, and a radially outward side R2 (i.e., an outward side in the radial direction R) is the opposite side of the field magnetic side. The radially outward side R2 is located opposite to the field magnet side in the radial direction R. Each slot 11 is formed to extend in the radial direction R. In the present embodiment, each slot 11 (specifically, a central portion of each slot 11 in the circumferential direction C) is formed to extend in parallel to the radial direction R. Alternatively, the armature 1 may be an armature to be used for an outer rotor type rotary electric machine. In this case, the radially outward side R2 is the field magnet side, and the radially inward side R1 is the opposite side of the field magnetic side.

The core 10 includes: a yoke portion 17 formed into a cylindrical shape (which is an annular shape as viewed in the axial direction L); and the teeth 16 extending from the yoke portion 17 to the field magnet side (i.e., the radially inward side R1 in the present embodiment). Each slot 11 is provided between two of the teeth 16 adjacent to each other in the circumferential direction C. An end of each slot 11 located on the opposite side of the field magnet side (i.e., an end of each slot 11 located on the radially outward side R2 in the present embodiment) is provided with a bottom 15. Field magnet side end faces of the teeth 16 define one of an inner peripheral surface 10a and an outer peripheral surface 10b of the core 10. In the present embodiment, the field magnet side end faces of the teeth 16 define the inner peripheral surface 10a. Each of the axial direction L, the radial direction R, and the circumferential direction C is defined with respect to the axis of the core 10 (the center of a circle defined by the inner peripheral surface 10a or the outer peripheral surface 10b of the core 10). The inner peripheral surface 10a of the core 10 or the outer peripheral surface 10b of the core 10 is a reference surface (a core reference surface) for each of the axial direction L, the radial direction R, and the circumferential direction C. The core 10 is made of a magnetic material. The core 10 is provided, for example, by stacking a plurality of magnetic sheets (e.g., electromagnetic steel sheets, such as silicon steel sheets). Alternatively, the core 10 may be provided by pressing magnetic material powder into a compact that serves as a main component.

As illustrated in FIGS. 1 to 4, the coil 30 includes: slot-housed portions 31 disposed inside the slots 11; and coil end portions 32 (connections) disposed outside the slots 11. The slot-housed portions 31 are housed inside the slots 11. The coil end portions 32 are protruded outward in the axial direction L through the axial openings 12. The coil end portions 32 each connect a pair of the slot-housed portions 31 housed in the slots 11 different from each other. An assembly of a plurality of the coil end portions 32 defines a coil end 33. The coil end 33 is a portion of the coil 30 protruding out of the core 10 (which is a portion of the coil 30 protruding outward in the axial direction L in this embodiment). Conductors (i.e., linear conductors 3) that define the coil end 33 are each equivalent to one of the coil end portions 32. In the present embodiment, each of the coil end portions 32 and the other coil end portion 32 adjacent thereto in the circumferential direction C are disposed to partially overlap with each other in the circumferential direction C. In other words, each of the coil end portions 32 and the other coil end portion 32 adjacent thereto in the circumferential direction C are disposed to overlap with each other as viewed in the radial direction R. In the present embodiment, each coil end portion 32 is disposed to connect a pair of the slot-housed portions 31 disposed away from each other in the circumferential direction C by a distance six times as great as an arrangement pitch for the slots 11 (i.e., by a six slot pitch). The coil end portions 32 are disposed such that each coil end portion 32 is shifted in location from the adjacent coil end portion 32 in the circumferential direction C by an arrangement pitch for the slots 11. Although the coil end portions 32 that define the coil end 33 are fixed to each other with a thermally melting resin P that has molten or has cured after melting (see FIG. 16 and FIG. 19) as will be described below, illustration of the thermally melting resin P is omitted in FIGS. 3 and 4. In other words, the thermally melting resin P that melts by application of heat is disposed in gaps between the coil end portions 32, with the thermally melting resin P cured after melting. The coil end 33 is provided on each side of the core 10 in the axial direction L.

The coil 30 includes the linear conductors 3 that are conductors each having a linear form. The linear conductors 3 are made of a conductive material, such as copper or aluminum. The surface of each linear conductor 3 except a portion thereof such as a connection with other conductor(s) is covered with an insulating coating made of an electrically insulating material, such as resin. Usable examples of the linear conductors 3 include: a stranded conductor provided by stranding a plurality of thin wires; and a conductor having a rectangular shape (which includes a square shape) in a cross section perpendicular to the direction of extension. The present embodiment involves using, as the linear conductors 3, conductors (e.g., rectangular wires) each having an oblong shape in a cross section perpendicular to the direction of extension. In the present embodiment, the coil 30 includes the linear conductors 3 each having a rectangular shape (which includes an oblong shape in this embodiment) in a cross section perpendicular to the direction of extension. Alternatively, conductors each having a shape other than a rectangular shape (e.g., conductors each having a circular shape) in a cross section perpendicular to the direction of extension may be used as the linear conductors 3.

Figure 3:
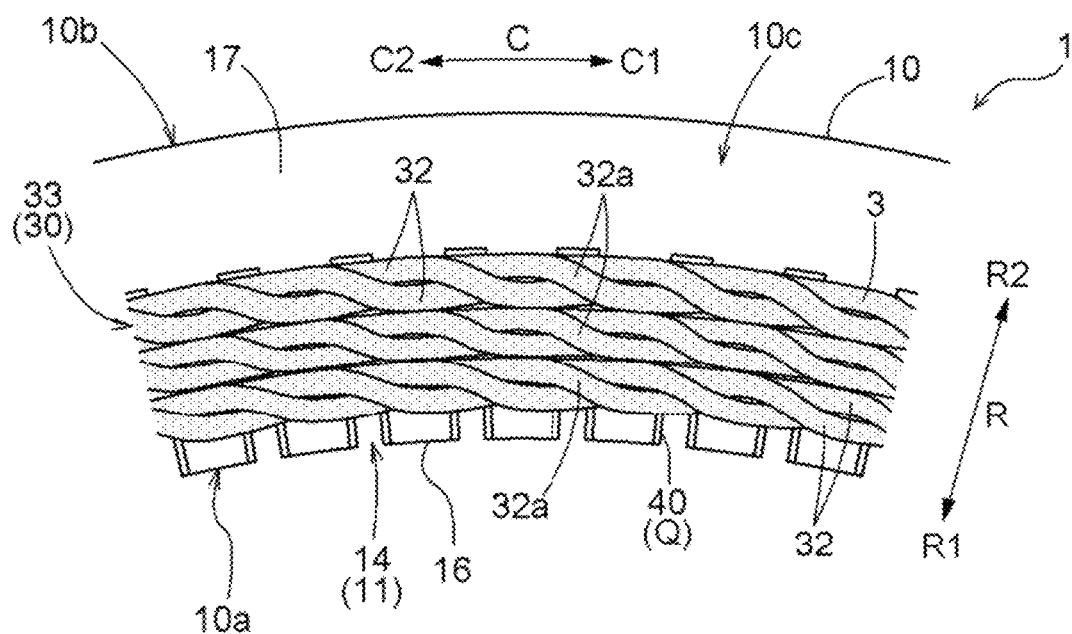
FIG. 3 is an axial view of a portion of the armature.
Figure 4:
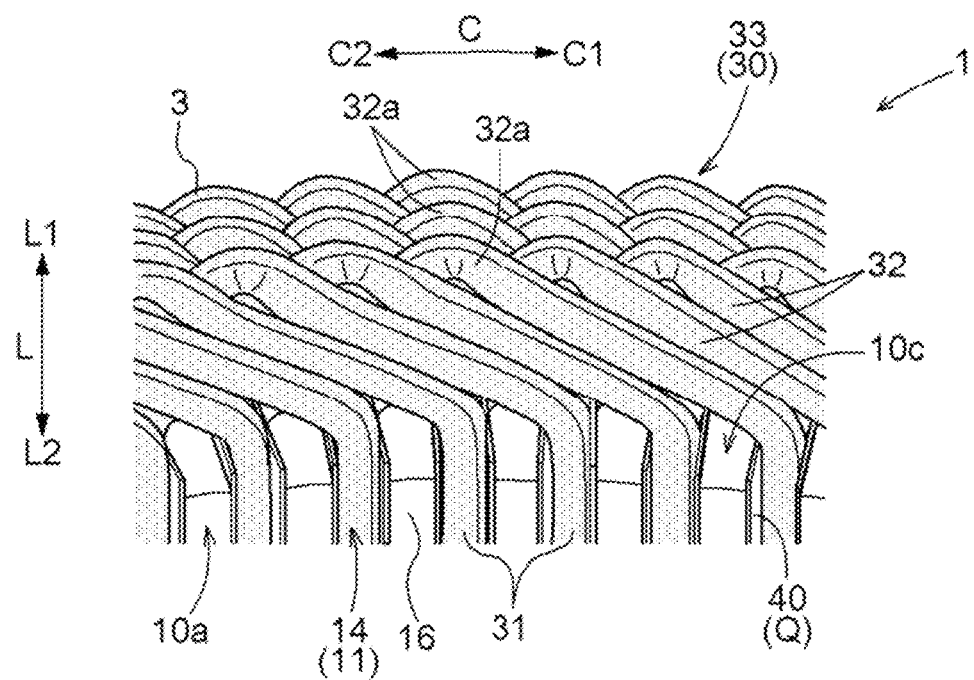
FIG. 4 is a perspective view of a portion of the armature.

The slot-housed portions 31 are disposed inside the slots 11 such that the slot-housed portions 31 extend in the axial direction L. In the present embodiment, the slot-housed portions 31 are disposed inside the slots 11 such that the slot-housed portions 31 extend in parallel with the axial direction L. A plurality of the slot-housed portions 31 is disposed inside each of the slots 11. In the present embodiment, the slot-housed portions 31 are disposed inside each of the slots 11 such that six slot-housed portions 31 are arranged in a row in the radial direction R. Assuming that a region where each of the slot-housed portions 31 is to be disposed defines a single layer in the radial direction R, the slot-housed portions 31 are disposed inside each of the slots 11 such that the slot-housed portions 31 are arranged in a plurality of separate layers (which is six layers in the present embodiment). In the present embodiment, a plurality of the slot-housed portions 31 is thus aligned in a row inside each slot 11. Alternatively, a plurality of the slot-housed portions 31 may be aligned in rows inside each slot 11. Each coil end portion 32 connects a pair of the slot-housed portions 31 housed in adjacent layers in different slots 11. As illustrated in FIGS. 3 and 4, each coil end portion 32 is provided with an offset portion 32a that offsets the associated linear conductor 3 by one layer in the radial direction R. Each offset portion 32a is provided on a region of the associated coil end portion 32 located farthest away from the core 10 in the axial direction L. In other words, each offset portion 32a is provided on the top of the associated coil end portion 32.

Each insulating sheet 40 is a sheet member (insulating paper) made of an electrically insulating material. As illustrated in FIGS. 1 and 2, each insulating sheet 40 includes: an intra-slot portion 50 disposed along an inner surface 20 of the associated slot 11; and a protruded portion 60 protruding out of the associated slot 11 through the opening (i.e., the axial opening 12 in the present embodiment) of the associated slot 11. In the present embodiment, each protruded portion 60 is formed to protrude outward in the axial direction L from the associated axial opening 12 (i.e., in a direction away from the center of the core 10 in the axial direction L). As used herein, the term "disposed along the inner surface 20 of the associated slot 11" refers to being disposed inside the associated slot 11 while conforming in shape to the inner surface 20 of the associated slot 11 and thus conceptually includes not only being disposed in contact with the inner surface 20 of the associated slot 11 but also being disposed out of contact with the inner surface 20 of the associated slot 11. In the present embodiment, each intra-slot portion 50 is disposed along the inner surface 20 of the associated slot 11 such that each intra-slot portion 50 is in contact with the inner surface 20 of the associated slot 11. Each intra-slot portion 50 is interposed between the coil 30 (i.e., the associated slot-housed portions 31) and the inner surface 20 of the associated slot 11. Each protruded portion 60 is interposed between the coil 30 (i.e. the associated coil end portions 32) and an opening end face 10c of the core 10. The core 10 and the coil 30 are thus electrically insulated from each other by the insulating sheets 40. The opening end face 10c of the core 10 is an end face of the core 10 located around opening edges 13 of the openings (i.e., the axial openings 12 in the present embodiment) of the slots 11. In the present embodiment, the opening end face 10c of the core 10 is an end face of the core 10 facing in the axial direction L.

Figure 14:
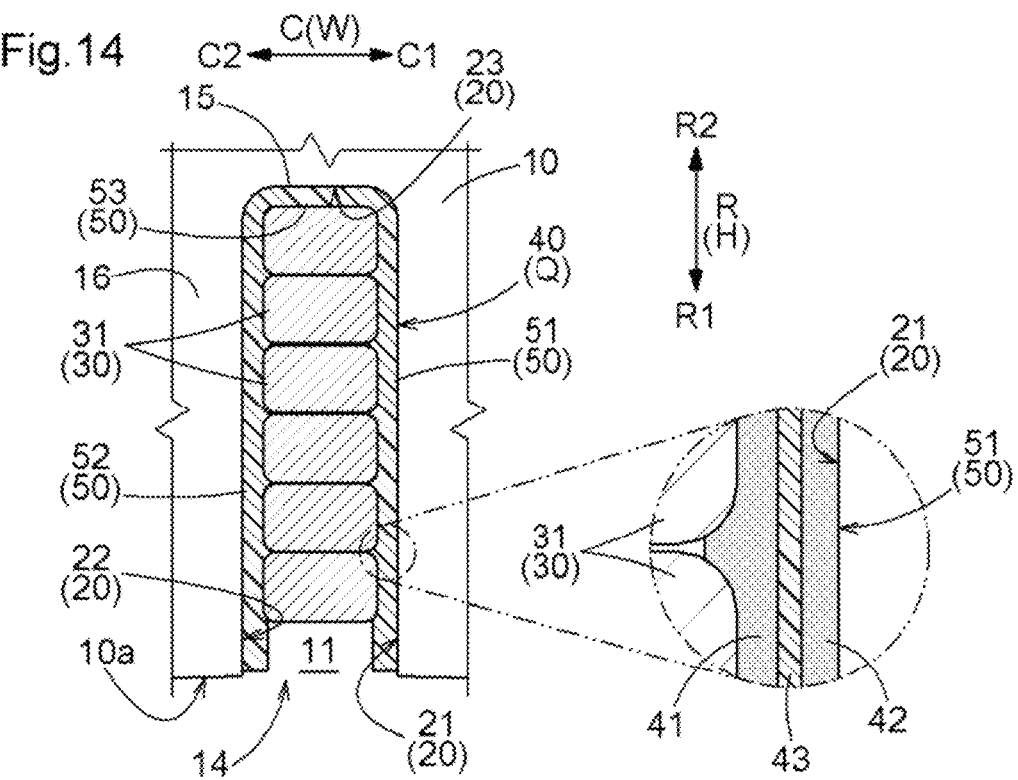
FIG. 14 is a cross-sectional view of a portion of the core taken in a direction perpendicular to the axial direction after a first heating step is carried out.

As illustrated in FIG. 14, the inner surface 20 of each slot 11 includes: a first inner surface 21 and a second inner surface 22 that are two inner surfaces facing each other in a width direction W of the slot 11; and a third inner surface 23 that is an inner surface that defines the bottom 15 of the slot 11. In the present embodiment, the width direction W of each slot 11 corresponds to (or substantially corresponds to) the circumferential direction C. Specifically, in a cross section perpendicular to the axial direction L, the width direction W of each slot 11 (i.e., the circumferential direction C) corresponds to a direction perpendicular to the radial direction R at a location where the slot 11 is disposed. Each of the first and second inner surfaces 21 and 22 is formed to extend in the axial direction L and the radial direction R. Each third inner surface 23 is formed to extend in the axial direction L and the width direction W (i.e., the circumferential direction C). One of the two inner surfaces facing each other in the width direction W (i.e., the circumferential direction C) is the first inner surface 21 located on a first circumferential side C1 that is a first side in the circumferential direction C. The other one of the two inner surfaces is the second inner surface 22 located on a second circumferential side C2 that is a second side in the circumferential direction C. The second circumferential side C2 is located opposite to the first circumferential side C1. Each third inner surface 23 connects ends of the associated first and second inner surfaces 21 and 22 located on the opposite side of the field magnet side (i.e., ends of the associated first and second inner surfaces 21 and 22 located on the radially outward side R2 in the present embodiment).

As described above, the inner surface 20 of each slot 11 includes the first inner surface 21, the second inner surface 22, and the third inner surface 23. Accordingly, the intra-slot portion 50 of each insulating sheet 40 according to the present embodiment includes: a first intra-slot portion 51 disposed along the first inner surface 21; a second intra-slot portion 52 disposed along the second inner surface 22; and a third intra-slot portion 53 disposed along the third inner surface 23. The first and second intra-slot portions 51 and 52 are each formed to extend in the axial direction L and the radial direction R. Each third intra-slot portion 53 is formed to extend in the axial direction L and the width direction W (i.e., the circumferential direction C). Each third intra-slot portion 53 connects ends of the associated first and second intra-slot portions 51 and 52 located on the opposite side of the field magnet side (i.e., ends of the associated first and second intra-slot portions 51 and 52 located on the radially outward side R2 in the present embodiment). In the present embodiment, the first, second, and third inner surfaces 21, 22, and 23 are each formed into a flat surface. Accordingly, the first, second, and third intra-slot portions 51, 52, and 53 are each formed into a flat plate shape (specifically, a rectangular flat plate shape).

Figure 7:
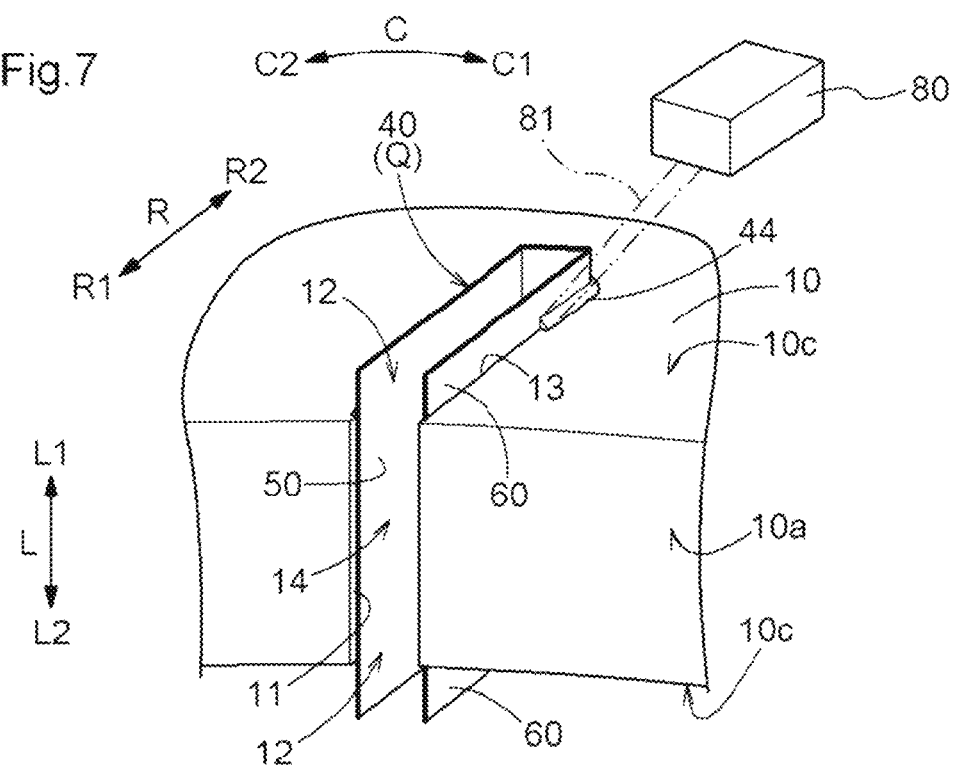
FIG. 7 is a perspective view of a portion of a core during a partially expanding step.
Figure 9:
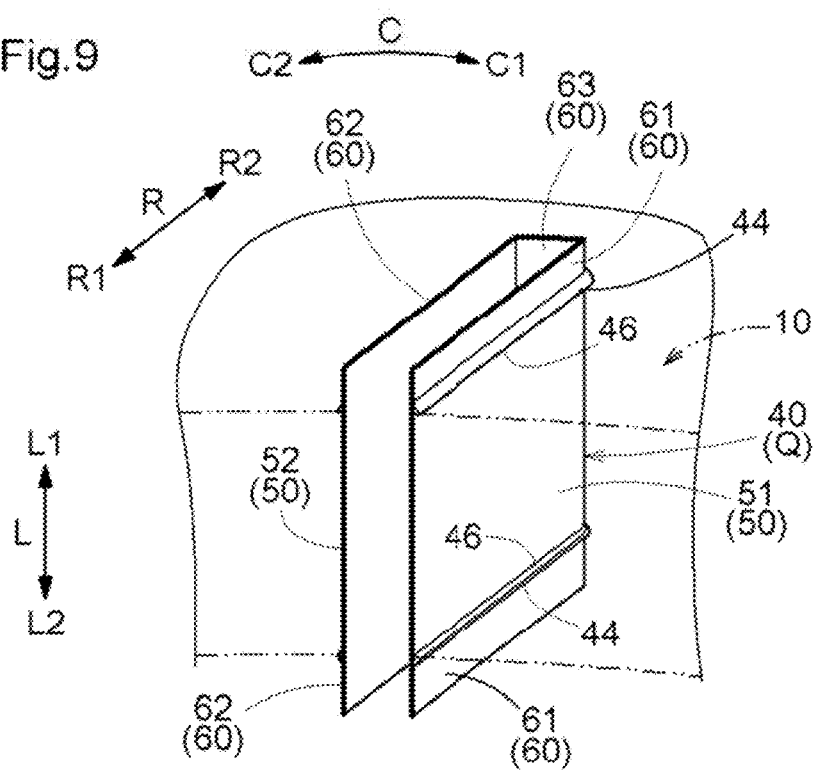
FIG. 9 is a perspective view of an insulating sheet after the partially expanding step is carried out.
Figure 10:
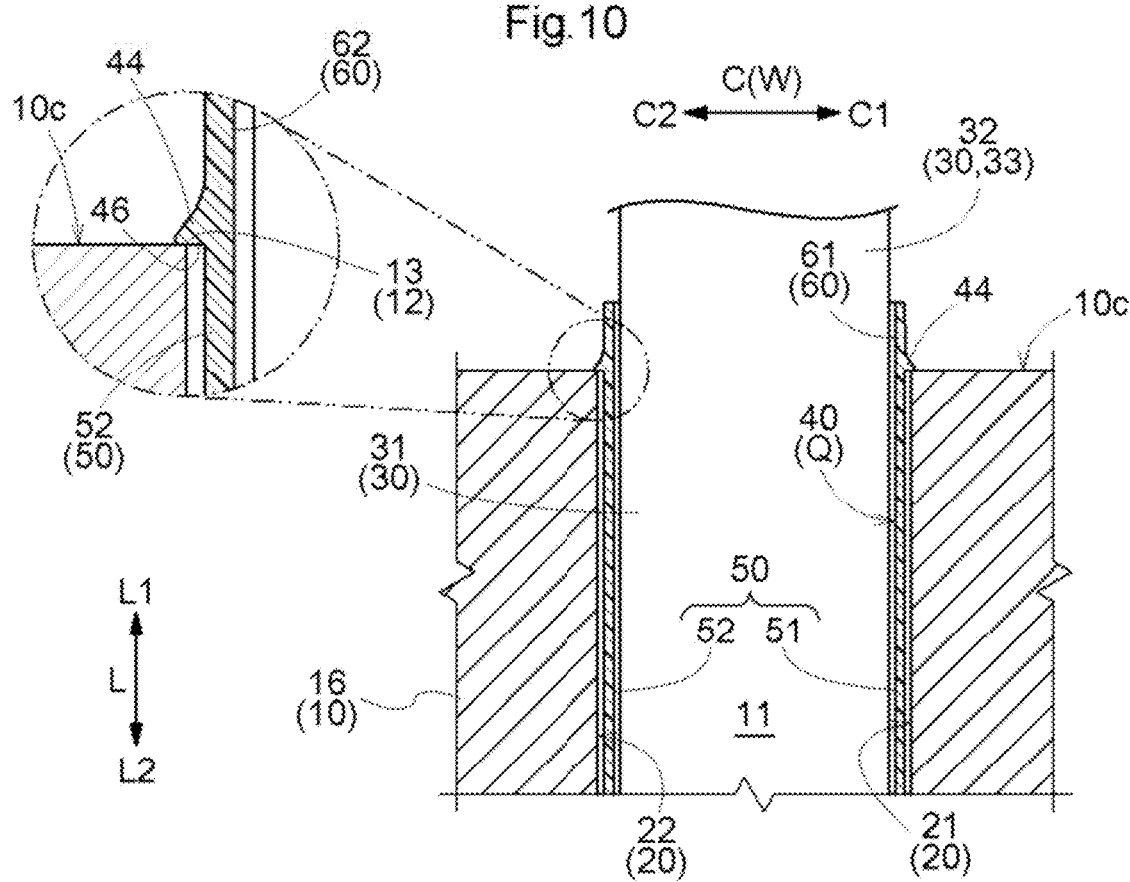
FIG. 10 is a cross-sectional view of a portion of the core taken in the axial direction after the coil disposing step is carried out.

In the present embodiment, the protruded portion 60 of each insulating sheet 40 includes: a first protruded portion 61 extending outward in the axial direction L from the associated first intra-slot portion 51; a second protruded portion 62 extending outward in the axial direction L from the associated second intra-slot portion 52; and a third protruded portion 63 extending outward in the axial direction L from the associated third intra-slot portion 53. As illustrated in FIGS. 7 and 9, the protruded portions 60 are provided on both sides in the axial direction L. In other words, the first, second, and third protruded portions 61, 62, and 63 are provided on both sides in the axial direction L. In the present embodiment, each insulating sheet 40 is provided by bending a sheet member. The portions of each insulating sheet 40 (e.g., the first intra-slot portion 51, the second intra-slot portion 52, the third intra-slot portion 53, the first protruded portion 61, the second protruded portion 62, and the third protruded portion 63) are formed to be continuous with each other.

As illustrated in FIG. 1, each protruded portion 60 according to the present embodiment is formed to extend out of the associated slot 11 through the associated axial opening 12 (i.e., outward in the axial direction L in the present embodiment) without any folded portion. In other words, each protruded portion 60 is formed to extend out of the associated slot 11 through the associated axial opening 12 in a uniform manner. As used herein, the term "folded portion" refers to a bent portion that reverses the direction of extension of each protruded portion 60 from its connection with the associated intra-slot portion 50 to its extremity (which is an end of each protruded portion 60 located opposite to the connection thereof with the associated intra-slot portion 50). Examples of such a bent portion include a bent portion that defines a cuff portion to suppress the associated insulating sheet 40 from coming out of the associated slot 11. As illustrated in FIG. 1, each protruded portion 60 is formed to extend outward in the axial direction L through the associated axial opening 12. In the present embodiment, each protruded portion 60 is formed to extend in parallel with the axial direction L.

Each insulating sheet 40 is an expandable insulating sheet that expands by application of heat. Each insulating sheet 40 that has expanded (has cured after expansion) is disposed in the core 10. Each insulating sheet 40 is an expandable insulating sheet that is expanded by application of heat, has its temperature returned to room temperature, and then maintains its expansion in this state. In the present embodiment, each insulating sheet 40 is a foamable insulating sheet that is foamed and expanded by application of heat. The foamable insulating sheet whose foaming component has been foamed by application of heat is disposed in the core 10. In the present embodiment, each insulating sheet 40 contains a thermosetting component in addition to a foaming component. Each insulating sheet 40 whose foaming component has foamed and then whose thermosetting component has cured is disposed in the core 10.

Each insulating sheet 40 includes at least a layer (expandable layer) that expands by application of heat. As illustrated in FIG. 14, each insulating sheet 40 according to the present embodiment has a three-layer structure. Specifically, each insulating sheet 40 includes a first expandable layer 41, a second expandable layer 42, and an intermediate layer 43. The first and second expandable layers 41 and 42 are expandable layers disposed separately on opposite sides of the intermediate layer 43 located therebetween. Specifically, the first expandable layer 41 is disposed adjacent to the slot-housed portions 31 with respect to the intermediate layer 43, and the second expandable layer 42 is disposed adjacent to the inner surface 20 of the slot 11 with respect to the intermediate layer 43. In the present embodiment, each insulating sheet 40 is disposed in the core 10, with both of the first and second expandable layers 41 and 42 expanded. In the present embodiment, each of the first and second expandable layers 41 and 42 is a layer containing a foamable component and a thermosetting component. Each of the first and second expandable layers 41 and 42 may be, for example, a layer (foamable resin layer) including a substrate which contains an epoxy resin (a thermosetting resin) and into which a capsule that expands by application of heat is blended. This capsule is, for example, a thermoplastic resin capsule in which a substance, such as a liquid that vaporizes by application of heat, is enclosed. The intermediate layer 43 may be, for example, a layer made of polyimide (PI) and/or polyphenylene sulfide (PPS). Alternatively, each insulating sheet 40 may include no such intermediate layer 43. Each insulating sheet 40 may be structured to include only a single or a plurality of expandable layers.

Figure 15:
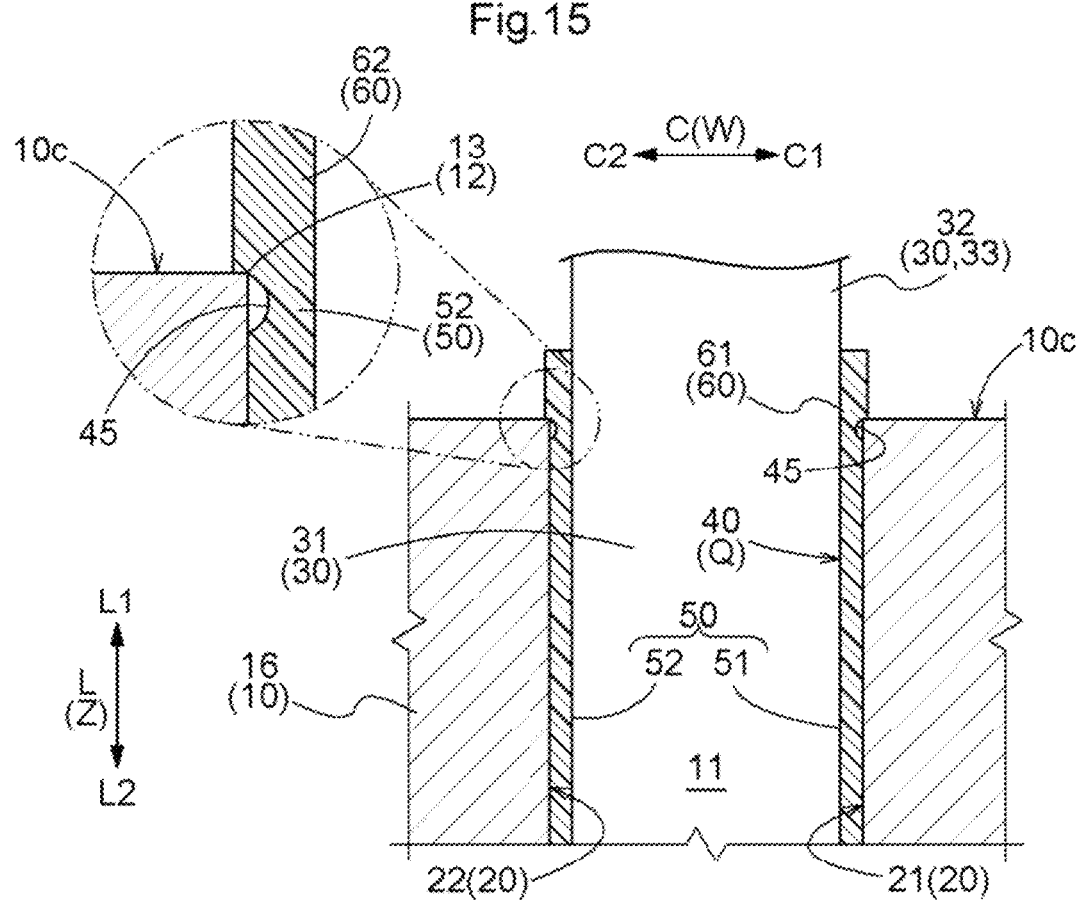
FIG. 15 is a cross-sectional view of a portion of the core taken in the axial direction after the first heating step is carried out.

As illustrated in FIGS. 14 and 15, with the insulating sheet 40 expanded (i.e., with the insulating sheet 40 expanded by foaming in the present embodiment), the intra-slot portion 50 is disposed between the slot-housed portions 31 and the inner surface 20 of the slot 11. The slot-housed portions 31 are fixed to the inner surface 20 of the slot 11 with a pressing force exerted by expansion of the intra-slot portion 50. The slot-housed portions 31 are thus fixed to the inner surface 20 of the slot 11 without use of varnish. In the present embodiment, an entirety of the intra-slot portion 50 is expanded. In the present embodiment, the entirety of the intra-slot portion 50 includes an expandable layer. The present embodiment thus involves using, as a thermally expandable resin Q to fix the slot-housed portions 31 to the inner surfaces 20 of the slots 11, the insulating sheets 40 each formed into a sheet (which is a solid sheet at room temperature in the present embodiment). In the present embodiment, the thermally expandable resin Q includes a thermosetting resin. The thermally expandable resin Q is a resin (resin composite) containing at least a thermosetting resin. In the present embodiment, the thermally expandable resin Q is a resin composite containing a thermosetting resin, a foaming agent, and a curing agent. Each sheet member (i.e., each insulating sheet 40), which is formed into a sheet and to be used as the thermally expandable resin Q, includes at least a layer (expandable layer) made of the thermally expandable resin Q. As described above, the sheet members (i.e., the insulating sheets 40) according to the present embodiment each include: two expandable layers (i.e., the first and second expandable layers 41 and 42) made of the thermally expandable resin Q; and a non-expandable layer (i.e., the intermediate layer 43) made of a material other than the thermally expandable resin Q. The thermally expandable resin Q that expands by application of heat is thus disposed between the slot-housed portions 31 and the inner surfaces of the slots 11, with the thermally expandable resin Q cured after expansion.

Figure 5:
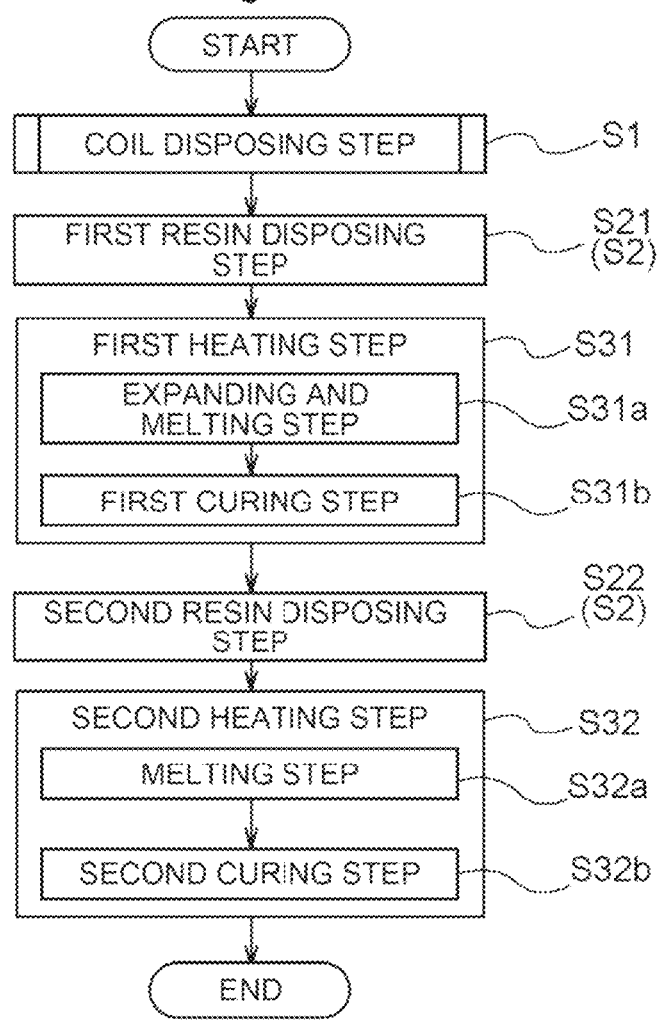
FIG. 5 is a flow chart illustrating an armature manufacturing method according to a first embodiment.

A method for manufacturing the armature 1 according to the present embodiment will be described below. As illustrated in FIG. 5, the method for manufacturing the armature 1 includes a coil disposing step S1, a resin disposing step S2 (which includes a first resin disposing step S21 and a second resin disposing step S22), and the first heating step S31. In the present embodiment, the method for manufacturing the armature 1 further includes a second heating step S32. Although not described in detail, the method for manufacturing the armature 1 naturally includes a preparing step that involves preparing components, such as the core 10, the coil 30, the thermally expandable resin Q (which is the insulating sheets 40 in the present embodiment), and the thermally melting resin P. In the present embodiment, the thermally expandable resin Q and the thermally melting resin P both include a thermosetting resin. In one example, the thermally expandable resin Q and the thermally melting resin P may both include a thermosetting resin of the same type.

Figure 6:
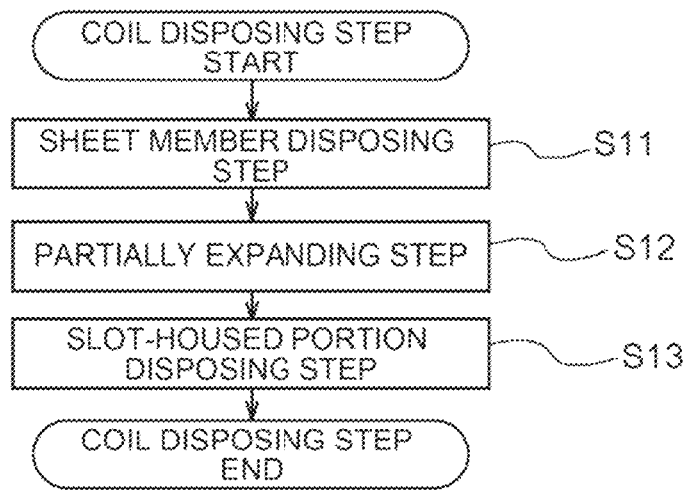
FIG. 6 is a flow chart illustrating a coil disposing step.

The coil disposing step S1 involves disposing the coil 30 in the core 10 using the thermally expandable resin Q that expands by application of heat, such that the pre-expansion thermally expandable resin Q is disposed between the slot-housed portions 31 and the inner surfaces 20 of the slots 11. In the present embodiment, the coil disposing step S1 involves disposing the coil 30 in the core 10 such that the coil end portions 32 protrude outward in the axial direction L through the axial openings 12 on both sides in the axial direction L. In the present embodiment, the coil disposing step S1 is carried out using the insulating sheets 40 as the thermally expandable resin Q. As illustrated in FIG. 6, the coil disposing step S1 according to the present embodiment includes a sheet member disposing step S11, a partially expanding step S12, and a slot-housed portion disposing step S13. Referring to FIGS. 7 to 11, the coil disposing step S1 according to the present embodiment will be described below.

The sheet member disposing step S11 involves disposing the pre-expansion insulating sheets 40 in the core 10 such that each insulating sheet 40 includes the intra-slot portion 50 disposed along the inner surface 20 of the associated slot 11 and the protruded portion 60 protruding out of the associated slot 11 through the opening (i.e., the axial opening 12 in the present embodiment) of the associated slot 11. In the present embodiment, each insulating sheet 40 is bent along two bending lines parallel to the axial direction L, so that each insulating sheet 40 is formed into the shape illustrated in FIG. 7. Each insulating sheet 40 that has been formed is inserted into the associated slot 11 through the axial opening 12 or the radial opening 14 such that each insulating sheet 40 is disposed in the core 10 as illustrated in FIG. 7. In other words, the sheet member disposing step S11 involves disposing the insulating sheets 40 such that the protruded portions 60 are provided on both sides in the axial direction L. In the present embodiment, the sheet member disposing step S11 involves disposing the insulating sheets 40 such that each protruded portion 60 extends out of the associated slot 11 through the associated axial opening 12 without any folded portion.

Figure 8:
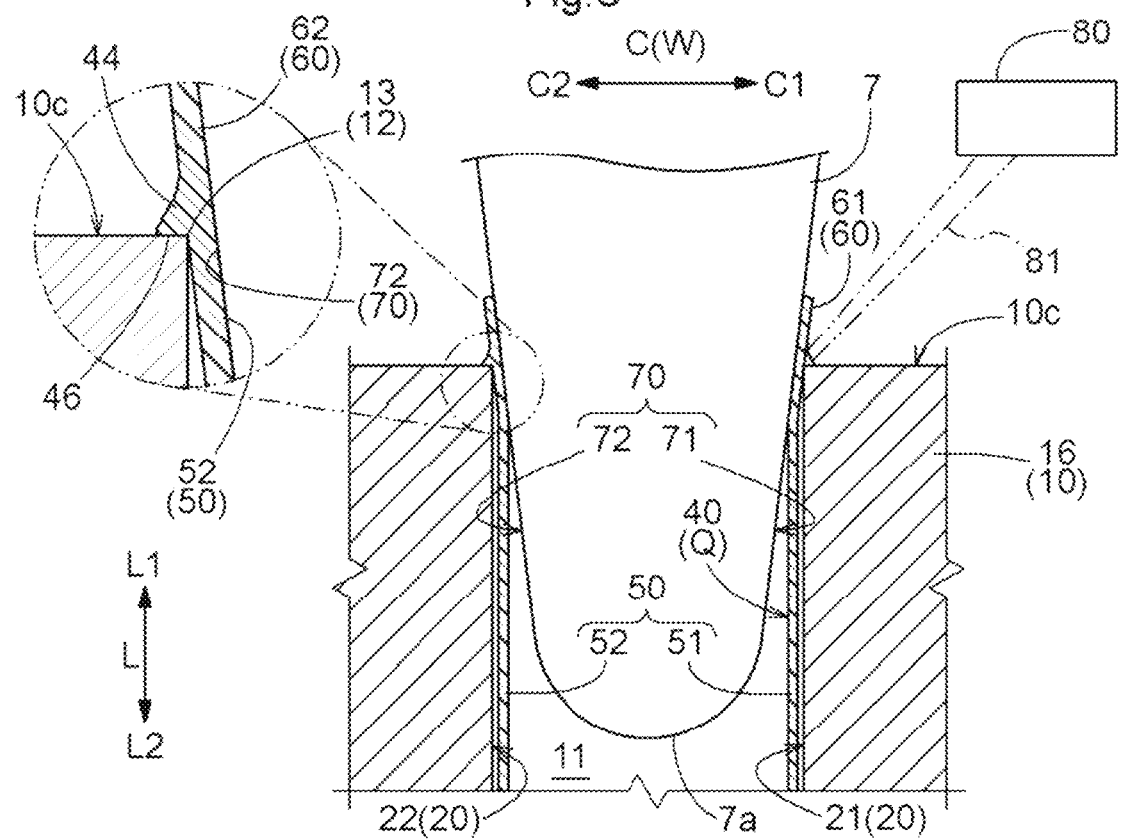
FIG. 8 is a cross-sectional view of a portion of the core taken in the axial direction during the partially expanding step.

The partially expanding step S12 involves, after the sheet member disposing step S11, heating and expanding target regions 44 of each insulating sheet 40 that extend along the opening edge 13 of the opening (which is the axial opening 12 in the present embodiment) of the associated slot 11. As illustrated in FIGS. 7 and 8, the partially expanding step S12 according to the present embodiment is carried out on the target regions 44 that are regions of each protruded portion 60 adjacent to the opening end face 10c of the core 10 (i.e., regions of each protruded portion 60 that connect with the associated intra-slot portion 50). In the present embodiment, the partially expanding step S12 is carried out on the target regions 44 that are provided on the first, second, and third protruded portions 61, 62, and 63.

In the present embodiment, the partially expanding step S12 is carried out on the target regions 44 provided on the protruded portions 60 located on both sides in the axial direction L. FIGS. 7 and 8 illustrate a portion of the core 10 in the course of carrying out the step of heating and expanding the target regions 44 located on a first side in the axial direction L (i.e., a first axial side L1). The partially expanding step S12 includes: a first partially expanding step that involves heating and expanding the target regions 44 located on the first side in the axial direction L (i.e., the first axial side L1); and a second partially expanding step that involves heating and expanding the target regions 44 located on a second side in the axial direction L (i.e., a second axial side L2). In the partially expanding step S12, the first and second partially expanding steps are carried out simultaneously or at different times. When the first and second partially expanding steps are carried out at different times in the partially expanding step S12, the first partially expanding step may be carried out first, and then the second partially expanding step may be carried out, with the core 10 flipped in the axial direction L (i.e., with the orientation of the core 10 reversed in the axial direction L). Alternatively, the partially expanding step S12 may be carried out only on the target regions 44 that are provided on the protruded portions 60 located on the first side in the axial direction L.

As illustrated in FIGS. 7 and 8, the partially expanding step S12 according to the present embodiment involves emitting a laser light 81 to the target regions 44 from a laser 80, thus heating and expanding only the target regions 44 (substantially only the target regions 44). In the present embodiment, a location where the laser light 81 is to be emitted is moved along the opening edge 13 of the axial opening 12, thus heating and expanding the target region 44 on the first protruded portion 61, the target region 44 on the second protruded portion 62, and the target region 44 on the third protruded portion 63. FIGS. 7 and 8 illustrate a state where the step of expanding the target region 44 on the second protruded portion 62 is finished and the step of expanding the target region 44 on the first protruded portion 61 is being carried out.

Expanding the target regions 44 by carrying out the partially expanding step S12 in the above-described manner makes it possible to form a step 46 on the insulating sheet 40 as illustrated in FIGS. 7 and 8. The step 46 is in contact with the opening end face 10c of the core 10. Specifically, carrying out the partially expanding step S12 expands the target regions 44 at least in a direction away from the slot 11 (i.e., in a direction away from the slot 11 as viewed in the axial direction L), so that the expanded regions form the step 46. In the present embodiment, the opening end face 10c of the core 10 is an end face of the core 10 facing in the axial direction L. The step 46 is formed such that the step 46 comes into contact with the opening end face 10c from outside in the axial direction L.

As illustrated in FIG. 8, the present embodiment involves using a support tool 7 including a support surface 70 that conforms in shape to the opening edge 13 of the opening (which is the axial opening 12 in the present embodiment) of the slot 11. The present embodiment involves inserting the support tool 7 into the slot 11 such that the support surface 70 faces the opening edge 13, and performing the partially expanding step S12, with the insulating sheet 40 sandwiched between the support surface 70 and the opening edge 13. In the present embodiment, the support tool 7 is inserted into the slot 11 from outside in the axial direction L. Sandwiching the insulating sheet 40 between the support surface 70 and the opening edge 13 in performing the partially expanding step S12 as just described makes it possible to expand the target regions 44 while suppressing expansion of regions of the insulating sheet 40 in contact with the opening edge 13. In the target regions 44 and regions adjacent thereto, contact between the insulating sheet 40 and the support surface 70 transmits heat from the insulating sheet 40 to the support tool 7. This causes the target regions 44 to expand substantially only in a direction away from the slot 11. Expanding the target regions 44 in this manner facilitates formation of the step 46 on the insulating sheet 40 such that the step 46 comes into contact with the opening end face 10c of the core 10. To perform the partially expanding step S12, with the insulating sheet 40 sandwiched between the support surface 70 and the opening edge 13, the present embodiment involves emitting the laser light 81 to the target regions 44 from the opposite side of the location of the support tool 7. The laser light is emitted to surfaces of the target regions 44 extending out of the axial opening 12 from surfaces of the target regions 44 facing the inner surface 20 of the slot 11.

As illustrated in FIG. 8, the support tool 7 according to the present embodiment is formed into a wedge shape such that the thickness of the support tool 7 in the width direction W of the slot 11 decreases as the support tool 7 extends to its tip 7a. The insulating sheet 40 is thus sandwiched between the support surface 70 and the opening edge 13 on both sides of the support tool 7 in the width direction W during the partially expanding step S12. The support surface 70 of the support tool 7 includes: a first support surface 71 to sandwich the insulating sheet 40 between the first support surface 71 and the opening edge 13 on a first side in the width direction W (i.e., on the first circumferential side C1); and a second support surface 72 to sandwich the insulating sheet 40 between the second support surface 72 and the opening edge 13 on a second side in the width direction W (i.e., on the second circumferential side C2). The partially expanding step S12 thus involves, with the location of the support tool 7 maintained, expanding the target regions 44 of the insulating sheet 40 on both sides in the width direction W so as to enable formation of the step 46 on both sides in the width direction W.

Although not illustrated, the support tool 7 according to the present embodiment is structured such that when the partially expanding step S12 is performed, the insulating sheet 40 is sandwiched between the support surface 70 and the opening edge 13 on both sides in the width direction W with respect to the support tool 7 and on the radially outward side R2 with respect to the support tool 7. Although not illustrated, the support surface 70 of the support tool 7 includes, in addition to the first and second support surfaces 71 and 72, a third support surface 73 to sandwich the insulating sheet 40 between the third support surface 73 and the opening edge 13 on the radially outward side R2. The partially expanding step S12 thus involves, with the location of the support tool 7 maintained, expanding the target regions 44 of the insulating sheet 40 on both sides in the width direction W and on the radially outward side R2 so as to enable formation of the step 46 on both sides in the width direction W and on the radially outward side R2.

Figure 11:
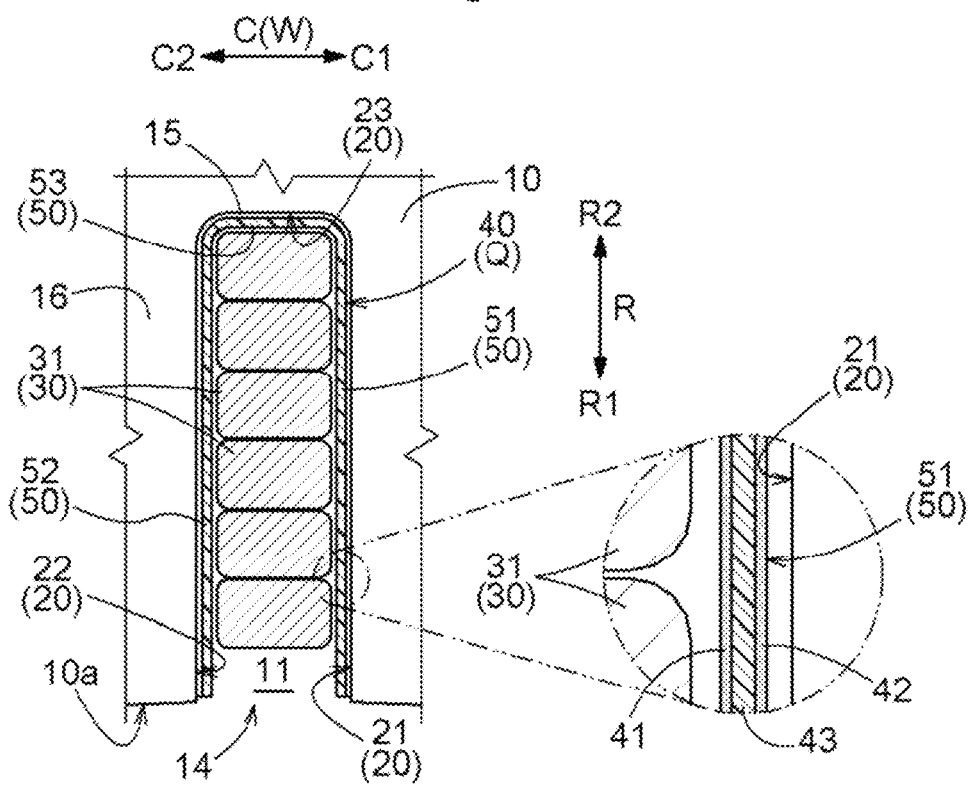
FIG. 11 is a cross-sectional view of a portion of the core taken in a direction perpendicular to the axial direction after the coil disposing step is carried out.

The slot-housed portion disposing step S13 involves, after the partially expanding step S12, disposing the slot-housed portions 31 inside each slot 11 such that the intra-slot portion 50 of each insulating sheet 40 is disposed (in other words, interposed) between the slot-housed portions 31 and the inner surface 20 of the associated slot 11. As illustrated in FIG. 11, the slot-housed portion disposing step S13 according to the present embodiment involves disposing the slot-housed portions 31 inside each slot 11 such that the first intra-slot portion 51 is disposed between the slot-housed portions 31 and the first inner surface 21, the second intra-slot portion 52 is disposed between the slot-housed portions 31 and the second inner surface 22, and the third intra-slot portion 53 is disposed between the slot-housed portion 31 (specifically, the slot-housed portion 31 disposed on the farthest opposite side of the field magnet side, which is the slot-housed portion 31 disposed on the radially outward side R2 in the present embodiment) and the third inner surface 23. In other words, the slot-housed portion disposing step S13 involves disposing the slot-housed portions 31 inside each slot 11 such that the slot-housed portions 31 (i.e., six slot-housed portions 31 in the present embodiment) are surrounded by the first, second, and third intra-slot portions 51, 52, and 53 (surrounded by the intra-slot portion 50 from three directions, i.e., from both sides in the circumferential direction C and the radially outward side R2).

The coil 30 may be structured such that the coil 30 before being disposed in the core 10 (i.e., before being wound around the core 10) is formed into the same shape as the coil 30 wound around the core 10 (such as a concentrically wound shape or a wave-wound shape), or may be structured such that the coil 30 is provided by connecting a plurality of segment conductors disposed in the core 10. In the former structure, the slot-housed portions 31 are inserted into each slot 11 from the radially inward side R1. In the latter structure, the slot-housed portions 31 may be inserted into each slot 11 from the radially inward side R1 or may be inserted into each slot 11 from outside in the axial direction L.

As described above, the partially expanding step S12 involves forming the steps 46 on the insulating sheets 40 such that the steps 46 are in contact with the opening end face 10c of the core 10. This makes it possible to, with a frictional force or an adhesive force exerted between each step 46 and the opening end face 10c, restrict movement of each insulating sheet 40 relative to the core 10 in carrying out the slot-housed portion disposing step S13. In the present embodiment, the steps 46 are formed on each insulating sheet 40 on both sides in the axial direction L (see FIG. 9). This makes it possible to restrict at least movement of each insulating sheet 40 to the first axial side L1 relative to the core 10 and movement of each insulating sheet 40 to the second axial side L2 relative to the core 10 in carrying out the slot-housed portion disposing step S13. Depending on the strength of the adhesive force between each step 46 and the opening end face 10c, each insulating sheet 40 may be restricted from moving in a direction perpendicular to the axial direction L relative to the core 10.

The armature manufacturing method according to the present embodiment involves carrying out the above-described coil disposing step S1 so as to dispose the coil 30 in the core 10, and then carrying out the first resin disposing step S21, the first heating step S31, the second resin disposing step S22, and the second heating step S32 in this order (see FIG. 5). Referring to FIGS. 12 to 19, the first resin disposing step S21, the first heating step S31, the second resin disposing step S22, and the second heating step S32 will be described below.

The resin disposing step S2 involves, before or after the coil disposing step S1, using the thermally melting resin P that melts by application of heat, such that the thermally melting resin P before melting is disposed in contact with the coil end portions 32. In the first resin disposing step S21 (which is included in the resin disposing step S2 and targeted for the coil end portions 32 on the first axial side L1), the thermally melting resin P before melting is disposed in contact with the coil end portions 32 on the first axial side L1. In the second resin disposing step S22 (which is included in the resin disposing step S2 and targeted for the coil end portions 32 on the second axial side L2), the thermally melting resin P before melting is disposed in contact with the coil end portions 32 on the second axial side L2. In the present embodiment, the resin disposing step S2 (which includes both of the first and second resin disposing steps S21 and S22) is carried out after the coil disposing step S1.

The present embodiment involves using, as the thermally melting resin P, a sheet member provided by forming a thermosetting resin (e.g., an epoxy resin) into a sheet. In the present embodiment, the sheet member is solid at room temperature. In the present embodiment, the thermally melting resin P thus includes a thermosetting resin. In other words, the thermally melting resin P is a resin (or resin composite) including at least a thermosetting resin. In the present embodiment, the thermally melting resin P is a resin composite containing a thermosetting resin and a curing agent. The thermally melting resin P to be disposed in the first resin disposing step S21 is a first thermally melting resin P1. The thermally melting resin P to be disposed in the second resin disposing step S22 is a second thermally melting resin P2. In the present embodiment, the same type of thermally melting resin P is used as the first thermally melting resin P1 and the second thermally melting resin P2.

Figure 12:
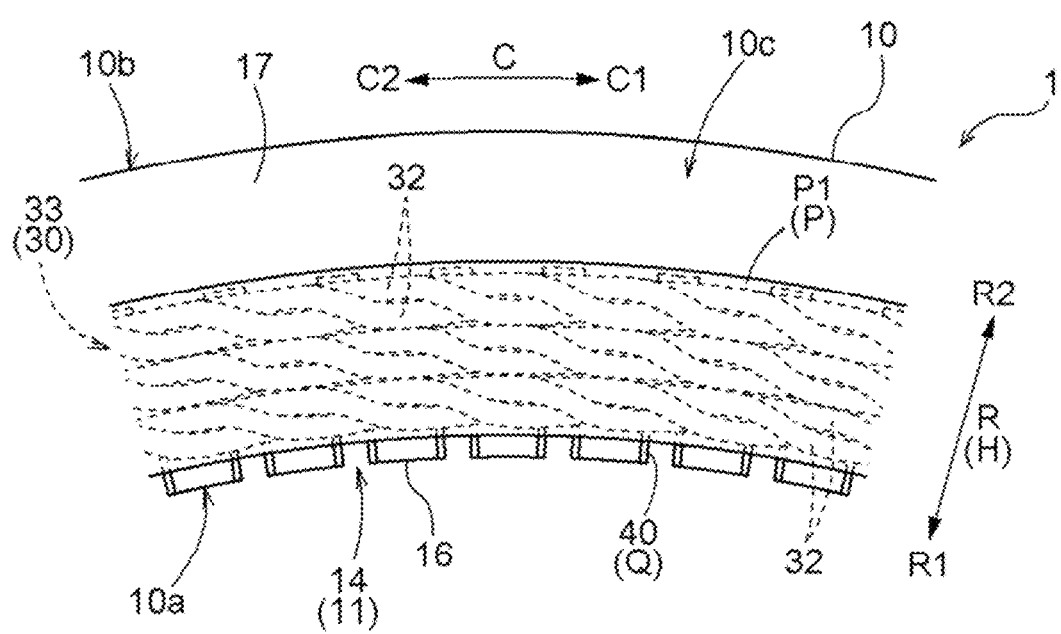
FIG. 12 is an axial view of a portion of the armature after a first resin disposing step is carried out.
Figure 13:
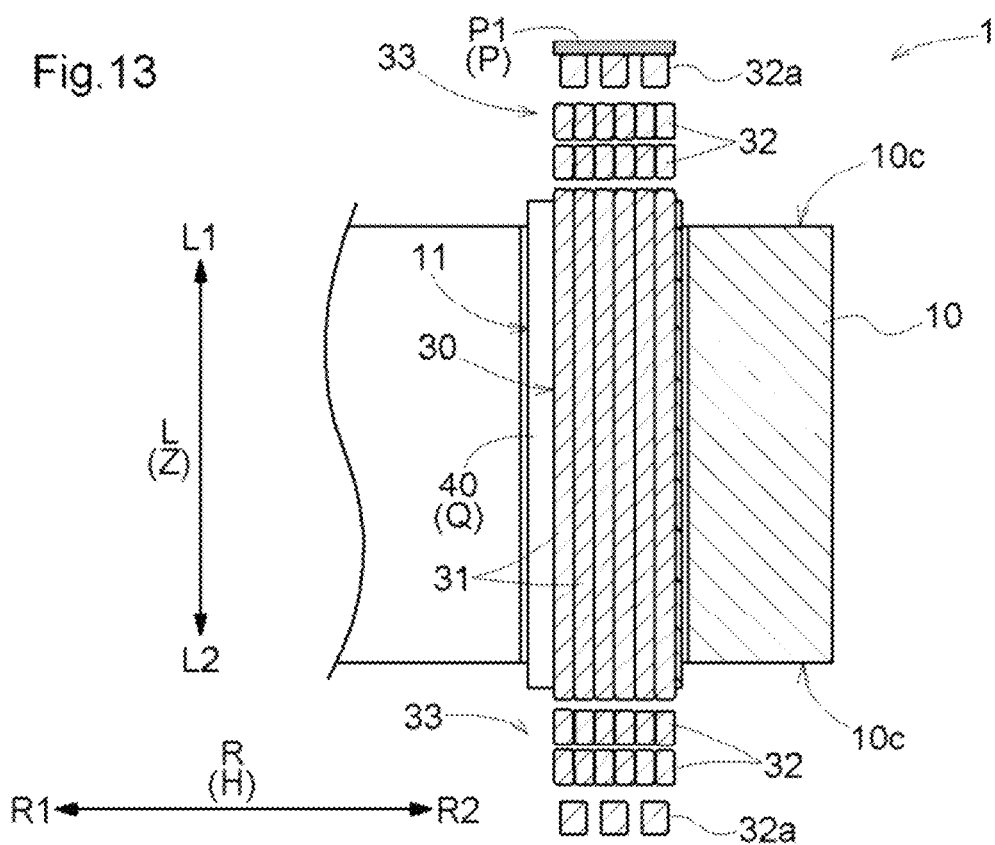
FIG. 13 is a cross-sectional view of a portion of the armature taken in the axial direction after the first resin disposing step is carried out.

In the present embodiment, the resin disposing step S2 involves disposing the thermally melting resin P such that the thermally melting resin P comes into contact with the coil end portions 32 from locations opposite to the core 10. Specifically, the first resin disposing step S21 involves, as illustrated in FIGS. 12 and 13, disposing the first thermally melting resin P1 such that the first thermally melting resin P1 comes into contact with the coil end portions 32 (i.e., the coil end portions 32 located on the first axial side L1) from the first axial side L1 located opposite to the core 10. The first thermally melting resin P1 is affixed to the coil end portions 32 with the adhesiveness of the first thermally melting resin P1. As previously mentioned, the top of each coil end portion 32 according to the present embodiment is provided with the offset portion 32a (see FIG. 4). The first thermally melting resin P1 is thus disposed such that the first thermally melting resin P1 comes into contact with the offset portions 32a of the coil end portions 32 from the first axial side L1.

As illustrated in FIG. 12, the first thermally melting resin P1 is disposed such that the coil end 33 defined by an assembly of the coil end portions 32, for example, is covered, across its entire region in the radial direction R, with the first thermally melting resin P1 from the first axial side L1. Alternatively, the first thermally melting resin P1 may be disposed to cover, from the first axial side L1, a portion of the coil end 33 in the radial direction R (e.g., an intermediate portion of the coil end 33 in the radial direction R). In one example, the first thermally melting resin P1 is disposed to cover, from the first axial side L1, the coil end 33 across its entire region in the circumferential direction C. When components, such as a connector and a terminal, are disposed on the coil end 33 located on the first axial side L1, the first thermally melting resin P1 may be disposed such that the first thermally melting resin P1 avoids a region of the coil end 33 defined in the circumferential direction C where such components are to be disposed.

The first heating step S31 involves, after the coil disposing step S1 and the resin disposing step S2 (which is the first resin disposing step S21 in the present embodiment), heating, expanding, and then curing the thermally expandable resin Q (which is the insulating sheets 40 in the present embodiment), and heating, melting, and then curing the thermally melting resin P (which is the first thermally melting resin P1 in the present embodiment). In the present embodiment, the first heating step S31 involves heating the thermally expandable resin Q and the thermally melting resin P together (i.e., heating both of the thermally expandable resin Q and the thermally melting resin P). As used herein, the expression "heating the thermally expandable resin Q and the thermally melting resin P together" refers to heating the thermally expandable resin Q and the thermally melting resin P simultaneously. In other words, the expression "heating the thermally expandable resin Q and the thermally melting resin P together" refers to heating the thermally expandable resin Q and the thermally melting resin P such that both of the thermally expandable resin Q and the thermally melting resin P will increase in temperature. When the thermally expandable resin Q and the thermally melting resin P are heated together in the first heating step S31, not a single temperature raising process but a plurality of temperature raising processes may be performed. In this case, the temperature raising processes may be performed while a different process, such as replacement of a jig, is performed in between. When the thermally expandable resin Q and the thermally melting resin P are heated together in the first heating step S31, both of expansion of the thermally expandable resin Q and melting of the thermally melting resin P do not necessarily have to be initiated in a single temperature raising process. In one example, one of expansion of the thermally expandable resin Q and melting of the thermally melting resin P may be initiated in a first temperature raising process, and then the other of expansion of the thermally expandable resin Q and melting of the thermally melting resin P may be initiated in a second temperature raising process. If both of expansion of the thermally expandable resin Q and melting of the thermally melting resin P are initiated in a single temperature raising process, an expanding reaction of the thermally expandable resin Q and a melting reaction of the thermally melting resin P do not necessarily have to progress in parallel. The thermally expandable resin Q and the thermally melting resin P may be heated together such that one of the expanding reaction of the thermally expandable resin Q and the melting reaction of the thermally melting resin P progresses, and then the other of the expanding reaction of the thermally expandable resin Q and the melting reaction of the thermally melting resin P progresses.

In the present embodiment, a temperature range in which the thermally expandable resin Q expands overlaps with a temperature range in which the thermally melting resin P (i.e., the first thermally melting resin P1) melts. In the present embodiment, a temperature range in which the thermally expandable resin Q cures overlaps with a temperature range in which the thermally melting resin P (i.e., the first thermally melting resin P1) cures. The first heating step S31 according to the present embodiment involves carrying out an expanding and melting step S31a and then carrying out a first curing step S31b. The expanding and melting step S31a involves heating both of the thermally expandable resin Q and the thermally melting resin P at a temperature (i.e., a first temperature) within the temperature range in which the thermally expandable resin Q expands and within the temperature range in which the thermally melting resin P melts. The first curing step S31b involves heating and curing both of the thermally expandable resin Q and the thermally melting resin P at a temperature (i.e., a second temperature) within the temperature range in which the thermally expandable resin Q cures and within the temperature range in which the thermally melting resin P cures. During the expanding and melting step S31a, the melting reaction of the thermally melting resin P and the expanding reaction of the thermally expandable resin Q progress in parallel. During the first curing step S31b, a curing reaction of the thermally melting resin P and a curing reaction of the thermally expandable resin Q progress in parallel. In one example, the second temperature is set at the same temperature as the first temperature or set higher than the first temperature.

The first heating step S31 involves, for example, heating both of the thermally expandable resin Q and the thermally melting resin P by passing a current through the coil 30, or heating both of the thermally expandable resin Q and the thermally melting resin P by placing the core 10 in a furnace, such as an electric furnace. Although not described in detail, the thermosetting resin included in the thermally expandable resin Q and the thermally melting resin P is molten by carrying out the expanding and melting step S31a, gelled with a lapse of time, and then cured as the curing reaction progresses as a result of carrying out the first curing step S31b. In the course of melting the thermosetting resin and then curing the thermosetting resin in this manner, a curing process to reliably cure the thermosetting resin takes a relatively long time. In the present embodiment, however, the step of curing the thermally expandable resin Q and the step of curing the thermally melting resin P are included in the same step (which is the first curing step S31b). This enables a reduction in the time required for the first heating step S31. In the present embodiment, the thermally expandable resin Q is a resin that softens and then expands by application of heat. In the present embodiment, a temperature at which the thermally melting resin P starts melting is higher than a temperature at which the thermally expandable resin Q starts softening. This enables the melting reaction of the thermally melting resin P and the expanding reaction of the thermally expandable resin Q to progress in parallel during the expanding and melting step S31a as described above, while preventing melting of the thermally melting resin P from starting earlier than softening of the thermally expandable resin Q.

As illustrated in FIGS. 14 and 15, carrying out the first heating step S31 fixes the slot-housed portions 31 to the inner surface 20 of each slot 11 with the thermally expandable resin Q (i.e., the intra-slot portion 50 of the associated insulating sheet 40) that has expanded (that has cured after expansion). The target regions 44 of each insulating sheet 40 are cured such that each target region 44 maintains its shape after being expanded by carrying out the partially expanding step S12. Thus, the target regions 44 will basically not be deformed by carrying out the first heating step S31. Accordingly, regions of each insulating sheet 40 adjacent to the target regions 44 provided with the steps 46 (i.e., regions of each insulating sheet 40 adjacent to the target regions 44 on both sides in the axial direction L in the present embodiment) expand in the course of transition from the state illustrated in FIG. 10 to the state illustrated in FIG. 15 as a result of carrying out the first heating step S31. This forms recesses 45 in each insulating sheet 40. Each recess 45 is recessed away from the opening edge 13 of the opening (which is the axial opening 12 in the present embodiment) of the associated slot 11. Each recess 45 is defined along the opening edge 13 of the associated axial opening 12. The thermally expandable resin Q of the armature 1 according to the present embodiment thus includes, in addition to the intra-slot portions 50 and the protruded portions 60, the recesses 45 defined along the opening edges 13 of the openings (i.e., the axial openings 12) and recessed away from the opening edges 13.

Figure 16:
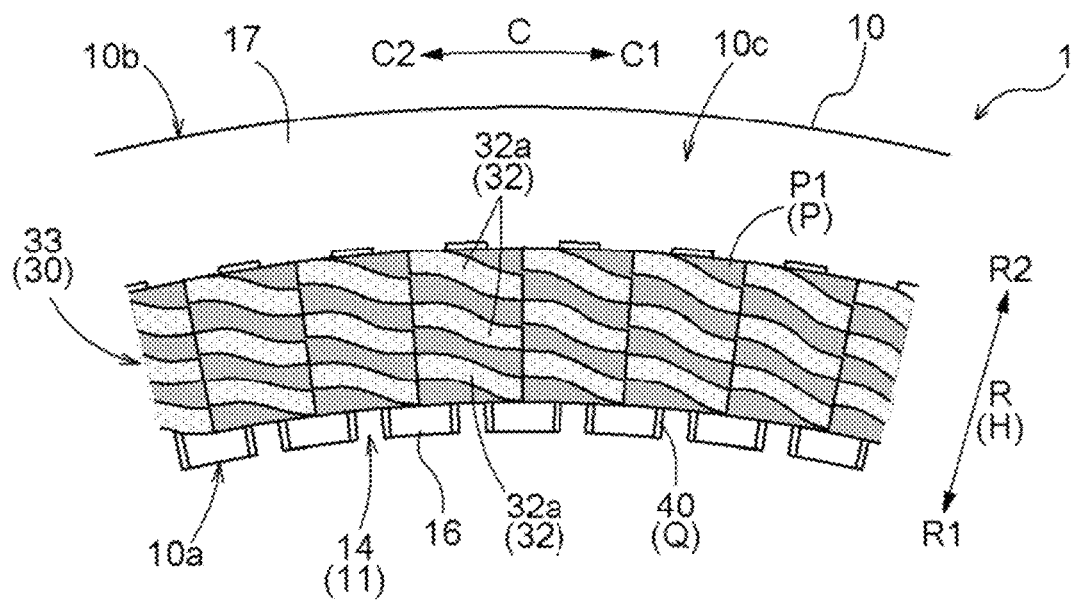
FIG. 16 is an axial view of a portion of the armature after the first heating step is carried out.
Figure 17:
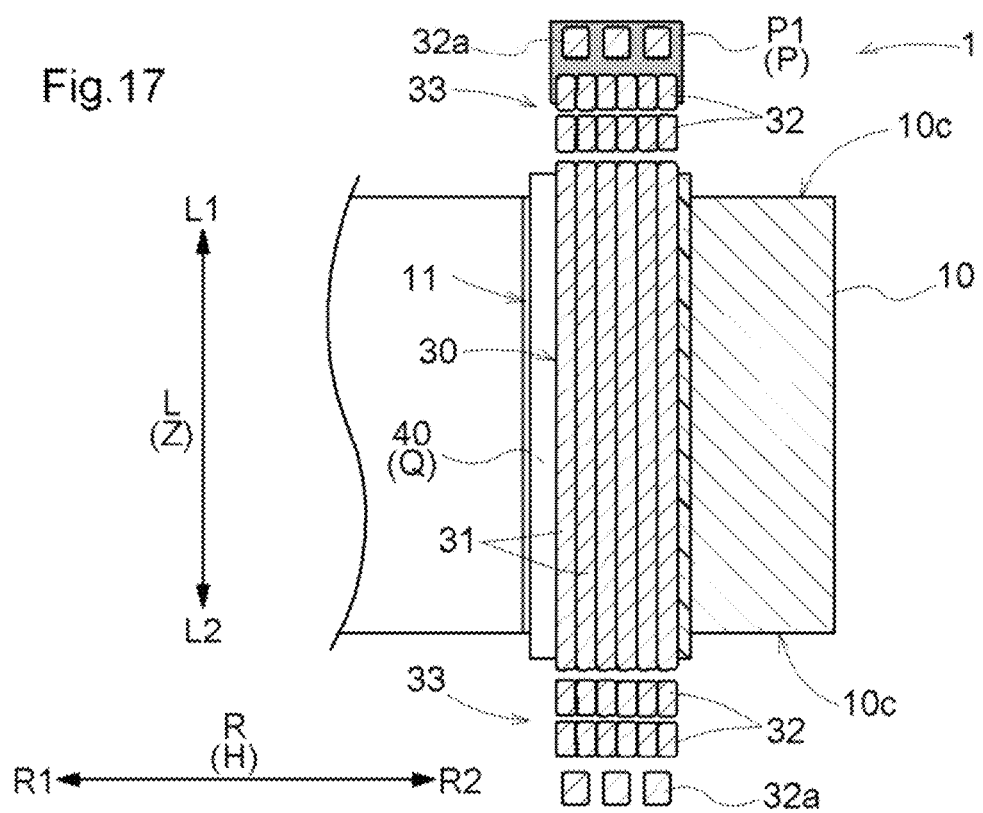
FIG. 17 is a cross-sectional view of a portion of the armature taken in the axial direction after the first heating step is carried out.

As illustrated in FIGS. 16 and 17, carrying out the first heating step S31 causes the molten first thermally melting resin P1 to flow into gaps between the coil end portions 32 that define the coil end 33 (i.e., the coil end 33 located on the first axial side L1), so that the coil end portions 32 are fixed to each other with the molten first thermally melting resin P1 (the first thermally melting resin P1 that has cured after melting). Although the molten first thermally melting resin P1 that may remain on surfaces of the offset portions 32a on the first axial side L1 is not illustrated in FIG. 16, the molten first thermally melting resin P1 may remain on the surfaces of the offset portions 32a on the first axial side L1 as illustrated in FIG. 17. The method for manufacturing armature 1 according to the present embodiment thus involves performing the first heating step S31, making it possible to not only fix the slot-housed portions 31 to the core 10 but also fix the coil end portions 32, which define the coil end 33 (i.e., the coil end 33 on the first axial side L1), to each other. In other words, the manufacturing method makes it possible to not only fix the slot-housed portions 31 to the core 10 but also fix the coil end portions 32, which define the coil end 33, to each other without performing a step of using impregnating liquid varnish.

After the first resin disposing step S21 is carried out, the first heating step S31 is carried out, with the first thermally melting resin P1 disposed above the core 10 as illustrated in FIG. 17. In the present embodiment, the first heating step S31 is carried out, with the core 10 disposed such that the axial direction L is parallel to a vertical direction Z (i.e., such that the radial direction R is parallel to a horizontal direction H). Carrying out the first heating step S31 in this manner causes the molten first thermally melting resin P1 to flow by gravity into gaps between the coil end portions 32 that define the coil end 33 (i.e., the coil end 33 on the first axial side L1), thus making it possible to fix the coil end portions 32 to each other with the molten first thermally melting resin P1. In the present embodiment, the first resin disposing step S21 (see FIG. 13) is performed, with the core 10 disposed such that its position (orientation) is the same as that in the first heating step S31 (see FIG. 17).

Figure 18:
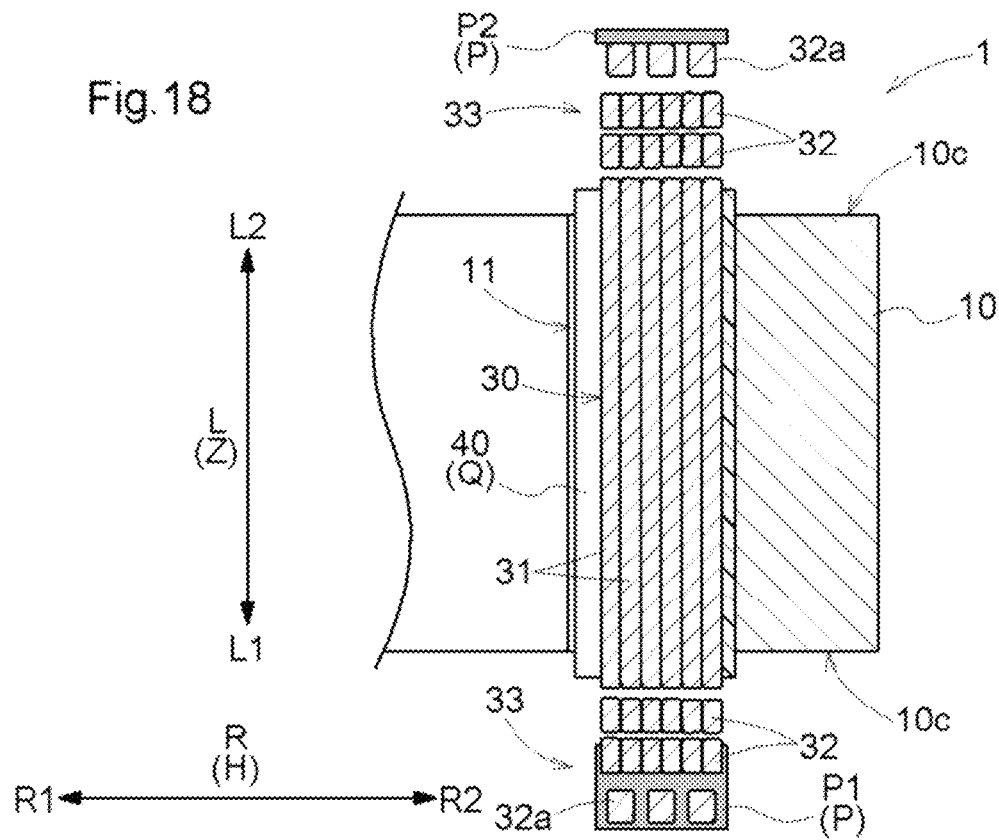
FIG. 18 is a cross-sectional view of a portion of the armature taken in the axial direction after a second resin disposing step is carried out.

As illustrated in FIG. 18, the second resin disposing step S22 is carried out after the first heating step S31 is carried out. The second resin disposing step S22 involves disposing the second thermally melting resin P2 such that the second thermally melting resin P2 comes into contact with the coil end portions 32 (i.e., the coil end portions 32 on the second axial side L2) from the second axial side L2 opposite to the core 10. The second resin disposing step S22 is similar to the first resin disposing step S21 except that the thermally melting resin to be disposed is changed from the first thermally melting resin P1 to the second thermally melting resin P2 and that the orientation of the core 10 in the axial direction L is reversed. Thus, detailed description of how the second resin disposing step S22 is performed will be omitted.

Figure 19:
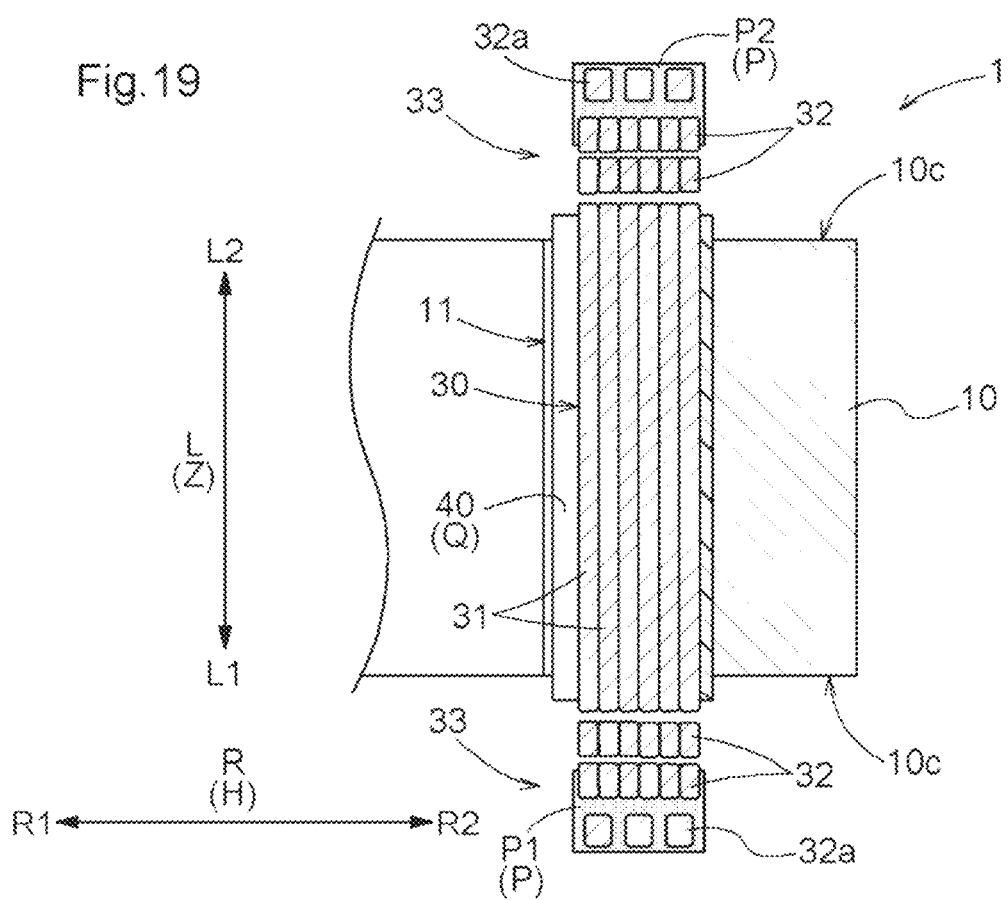
FIG. 19 is a cross-sectional view of a portion of the armature taken in the axial direction after a second heating step is carried out.

As illustrated in FIG. 19, the second heating step S32 is carried out after the second resin disposing step S22 is carried out. The second heating step S32 involves, with the second thermally melting resin P2 disposed above the core 10, heating the second thermally melting resin P2 so as to melt the second thermally melting resin P2 and then curing the molten second thermally melting resin P2. The second heating step S32 involves carrying out a melting step S32a and then carrying out a second curing step S32b. The melting step S32a involves heating the second thermally melting resin P2 at a temperature within a temperature range in which the second thermally melting resin P2 melts. The second curing step S32b involves heating and curing the second thermally melting resin P2 at a temperature within a temperature range in which the second thermally melting resin P2 cures. The heating temperature in the second heating step S32 may be the same as the heating temperature in the first heating step S31.

As illustrated in FIG. 19, the present embodiment involves carrying out the second heating step S32, with the core 10 disposed such that the axial direction L is parallel to the vertical direction Z. Thus, carrying out the second heating step S32 causes the molten second thermally melting resin P2 to flow by gravity into gaps between the coil end portions 32 that define the coil end 33 (i.e., the coil end 33 on the second axial side L2), thus making it possible to fix the coil end portions 32 to each other with the molten second thermally melting resin P2. In the present embodiment, the second resin disposing step S22 (see FIG. 18) is performed, with the core 10 disposed such that its position (orientation) is the same as that in the second heating step S32 (see FIG. 19). This requires performing the step of inverting the core 10 in the axial direction L between the first heating step S31 and the second resin disposing step S22.

As described above, the method for manufacturing the armature 1 according to the present embodiment enables the molten thermally melting resin P to flow by gravity into gaps between the coil end portions 32 that define the coil ends 33 on both sides in the axial direction L. In the present embodiment, the viscosity of the molten thermally melting resin P (i.e., the molten first and second thermally melting resins P1 and P2) is set such that the coil end portions 32 are fixed to each other with the molten thermally melting resin P (i.e., the molten first and second thermally melting resins P1 and P2) only in portions of the coil ends 33 located outward in the axial direction L (i.e., located opposite to the core 10) as illustrated in FIGS. 17 and 19. This makes it possible to provide gaps (i.e., gaps between the coil end portions 32) for suitable cooling in portions of the coil ends 33 located inward in the axial direction L (i.e., located adjacent to the core 10).

Figure 25:
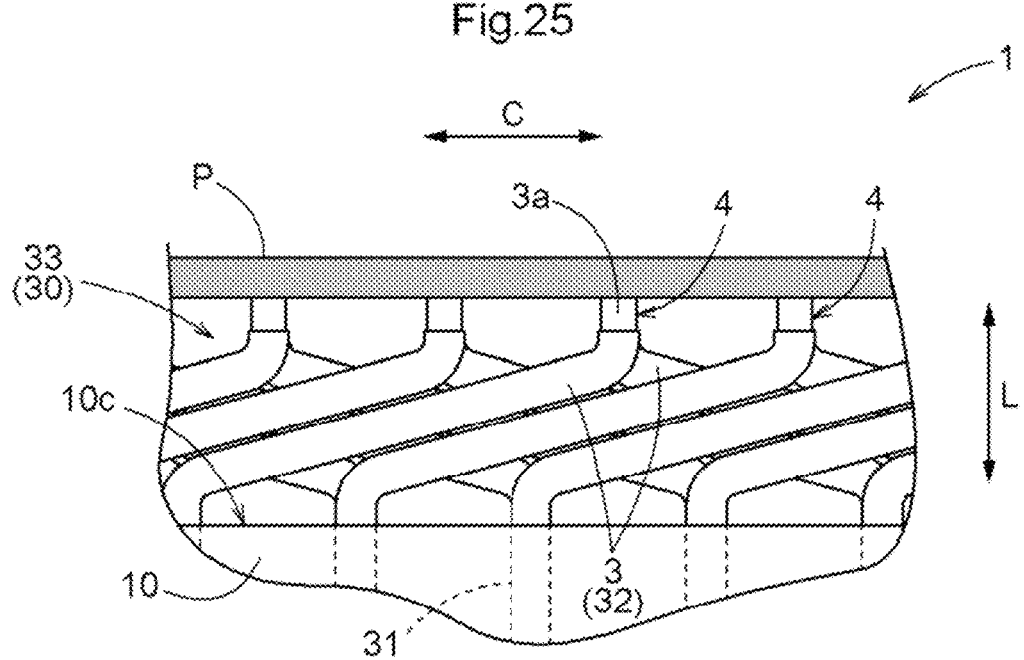
FIG. 25 is a radial view of a portion of an armature after a resin disposing step according to an alternative embodiment is carried out.
Figure 26:
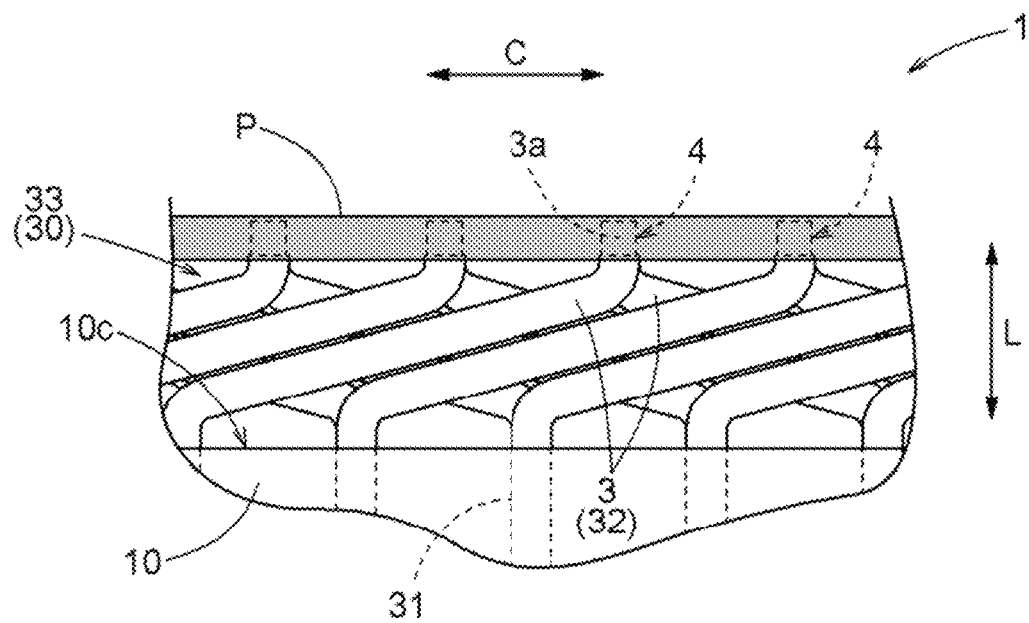
FIG. 26 is a radial view of a portion of the armature after a heating step according to the alternative embodiment is carried out.

As illustrated in FIGS. 25 and 26 by way of example, the coil 30 may be provided by connecting a plurality of the linear conductors 3 (e.g., segment conductors) outside the slots 11. When the linear conductors 3 are connected to each other at locations outward of the slots 11 in the axial direction L as illustrated in FIGS. 25 and 26, at least the coil end 33 located on one side in the axial direction L is provided with connections 4 between the linear conductors 3. Each linear conductor 3 includes a coating-stripped portion 3a that has its insulating coating stripped off. Connecting each coating-stripped portion 3a to the associated coating-stripped portion 3a of the connection target linear conductor 3 by, for example, welding provides the connections 4. As illustrated in FIG. 25, the resin disposing step S2 in this case preferably involves disposing the pre-melting thermally melting resin P such that the thermally melting resin P comes into contact with the connections 4 between the linear conductors 3 that define the coil end portions 32. Disposing the thermally melting resin P in this manner makes it possible to provide electric insulation for the connections 4 by covering the connections 4 with the molten thermally melting resin P (see FIG. 26), in addition to fixing the coil end portions 32 to each other with the molten thermally melting resin P by melting the pre-melting thermally melting resin P and then curing the thermally melting resin P by the first heating step S31. In other words, disposing the thermally melting resin P in this manner makes it possible to manufacture the armature 1 in which the connections 4 between the linear conductors 3 that define the coil end portions 32 are covered with the thermally melting resin P.

Second Embodiment

Figure 20:
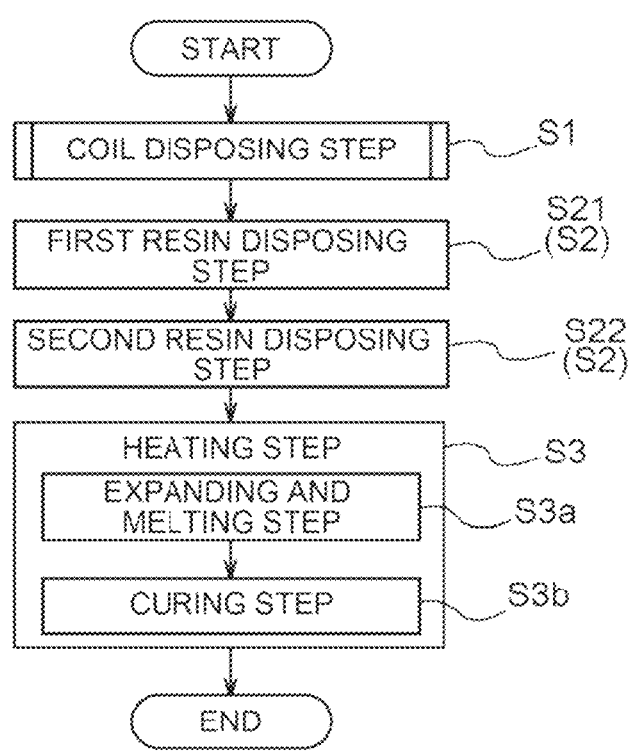
FIG. 20 is a flow chart illustrating an armature manufacturing method according to a second embodiment.
Figure 21:
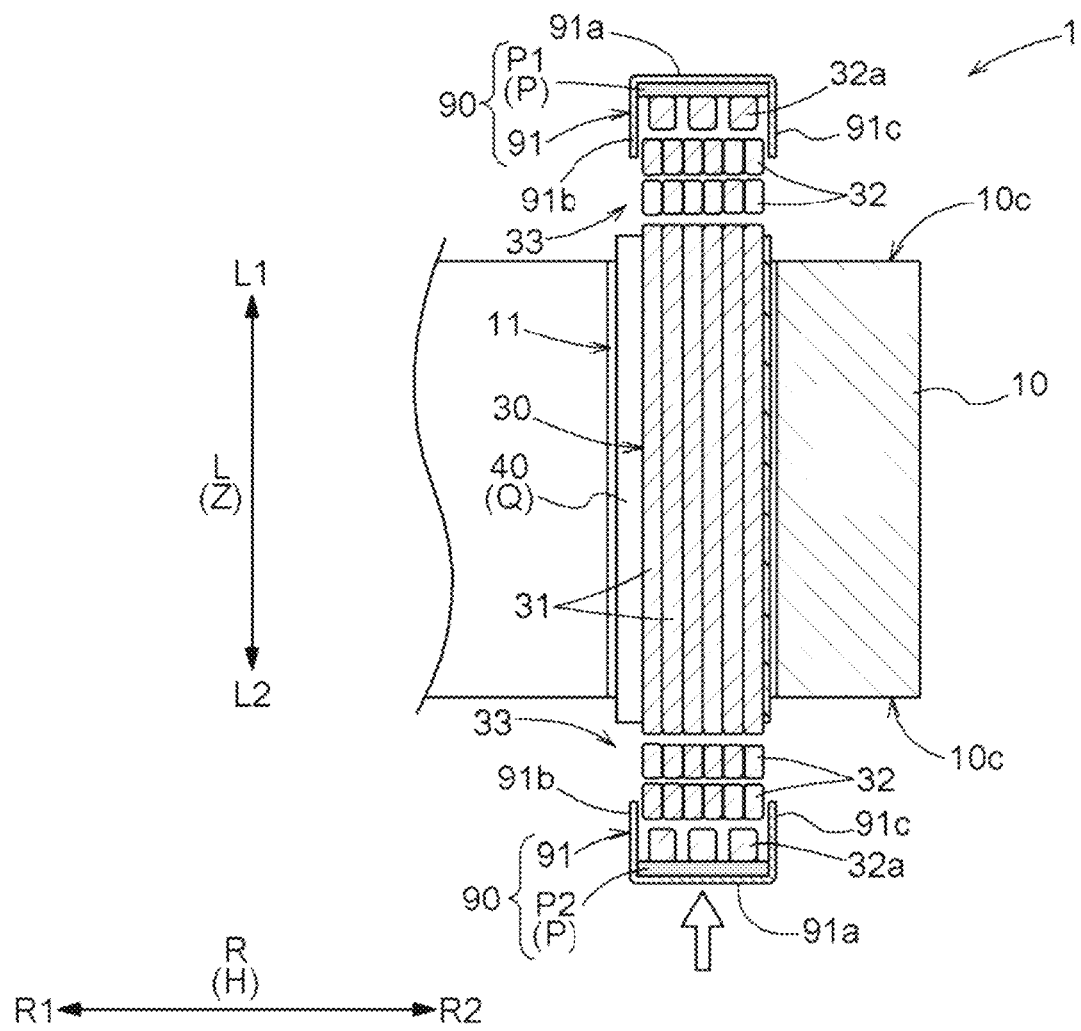
FIG. 21 is a cross-sectional view of a portion of an armature taken in an axial direction after a first resin disposing step and a second resin disposing step are carried out.
Figure 22:
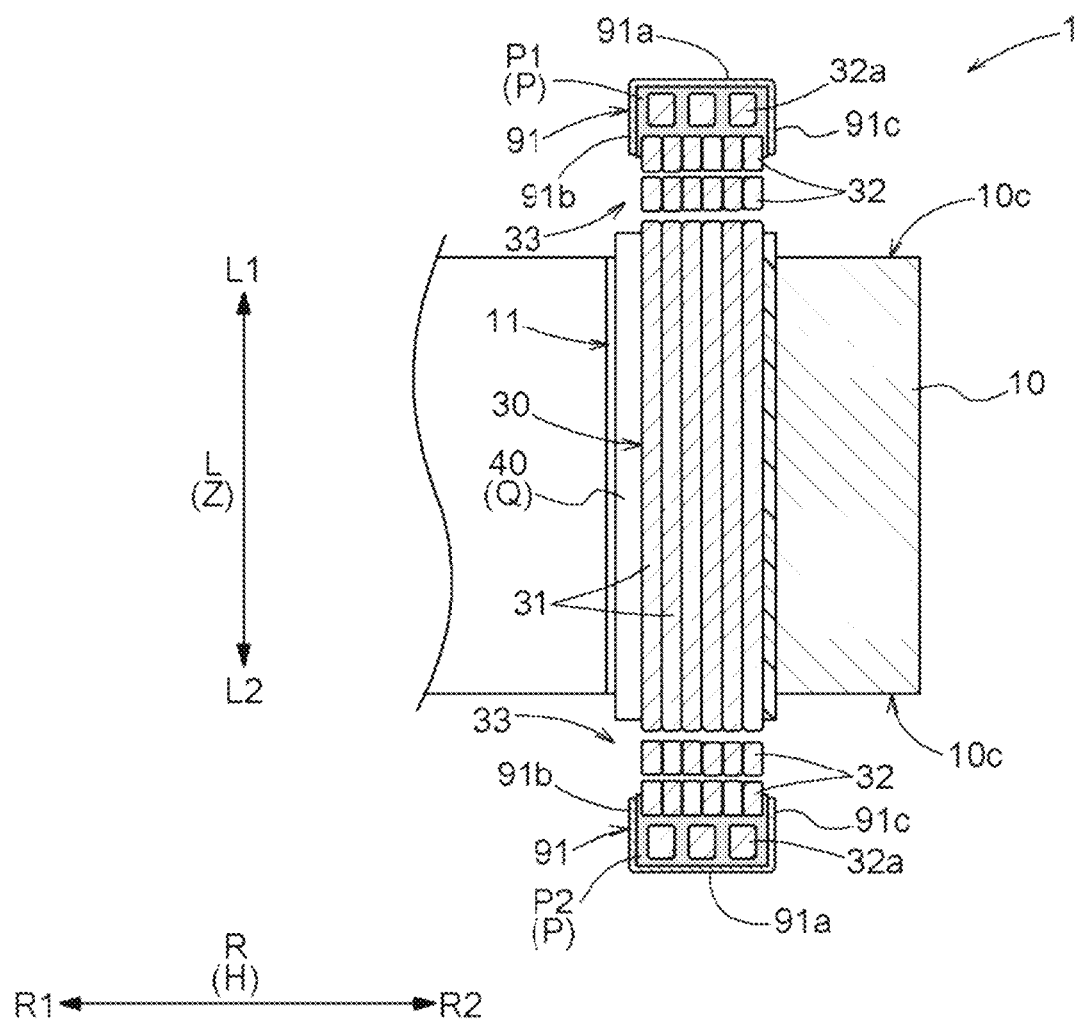
FIG. 22 is a cross-sectional view of a portion of the armature taken in the axial direction after a heating step is carried out.

An armature manufacturing method and an armature according to a second embodiment will be described with reference to the drawings (FIGS. 20 to 22). The following description focuses on differences between the armature manufacturing method according to the second embodiment and the armature manufacturing method according to the first embodiment. Unless otherwise specified, steps and components in the second embodiment similar to those in the first embodiment are identified by the same reference signs, and detailed description thereof will be omitted. In the present embodiment, a heating step S3 is equivalent to the "heating step", and a first portion 91a is equivalent to a "body".

As illustrated in FIG. 22, the armature 1 manufactured in the present embodiment includes insulating members 91 each having a melting point higher than that of the thermally melting resin P and having electrical insulation properties. In one example, each insulating member 91 has electrical insulation properties higher than those of the thermally melting resin P. The armature 1 includes the insulating members 91 on the coil ends 33 located on both sides in the axial direction L. The insulating member 91 disposed on the coil end 33 on the first axial side L1 has a melting point higher than that of the first thermally melting resin P1 and electrical insulation properties (which are, for example, higher than those of the first thermally melting resin P1). The insulating member 91 disposed on the coil end 33 on the second axial side L2 has a melting point higher than that of the second thermally melting resin P2 and electrical insulation properties (which are, for example, higher than those of the second thermally melting resin P2). Each insulating member 91 is made of, for example, polyphenylene sulfide (PPS), polypropylene (PP), or polyimide (PI).

Each insulating member 91 includes the first portion 91a covering the coil end portions 32 from a core-facing location that is located opposite to the core 10. As used herein, the term "core-facing location" refers to a location on the first axial side L1 for the insulating member 91 disposed on the coil end 33 on the first axial side L1, and the term "core-facing location" refers to a location on the second axial side L2 for the insulating member 91 disposed on the coil end 33 on the second axial side L2. In the present embodiment, each first portion 91a is formed to cover, from the core-facing location, the associated coil end 33 (which is defined by an assembly of a plurality of the associated coil end portions 32) across the entire region thereof in the radial direction R. In the present embodiment, each first portion 91a is formed to cover, from the core-facing location, the associated coil end 33 across the entire region thereof in the circumferential direction C. When components, such as a connector and a terminal, are disposed on the coil ends 33, the first portions 91a may be disposed such that the first portions 91a avoid regions of the coil ends 33 defined in the circumferential direction C where such components are to be disposed.

As illustrated in FIG. 22, each insulating member 91 according to the present embodiment includes, in addition to the first portion 91a, a second portion 91b and a third portion 91c. Each second portion 91b is formed to cover the associated coil end 33 (i.e., a portion of the associated coil end 33 located at the core-facing location) from the radially inward side R1. Each third portion 91c is formed to cover the associated coil end 33 (i.e., a portion of the associated coil end 33 located at the core-facing location) from the radially outward side R2. Each insulating member 91 does not necessarily have to include the first, second, and third portions 91a, 91b, and 91c but may include at least the first portion 91a. Each insulating member 91 may include no second portion 91b or may include no third portion 91c. Each insulating member 91 may include neither the second portion 91b nor the third portion 91c.

As illustrated in FIG. 21, the resin disposing step S2 according to the present embodiment involves disposing single-piece structures 90 such that the thermally melting resin P comes into contact with the coil end portions 32 from the core-facing locations. Each single-piece structure 90 includes the thermally melting resin P and the associated insulating member 91 integral with each other such that the first portion 91a is fixed to a surface of the thermally melting resin P located opposite to its surface in contact with the coil end portions 32. As illustrated in FIG. 22, both of the thermally expandable resin Q and the thermally melting resin P are heated at a temperature within the temperature range in which the thermally expandable resin Q expands and within the temperature range in which the thermally melting resin P (which includes the first and second thermally melting resins P1 and P2) melts. The first portions 91a of the insulating members 91 are thus fixed to the coil end portions 32 with the molten thermally melting resin P.

As illustrated in FIG. 20, the armature manufacturing method according to the present embodiment includes the coil disposing step S1, the resin disposing step S2 (which includes the first and second resin disposing steps S21 and S22), and the heating step S3. Similarly to the first heating step S31 according to the first embodiment, the heating step S3 involves heating, expanding, and then curing the thermally expandable resin Q, and heating, melting, and then curing the thermally melting resin P (which includes the first and second thermally melting resins P1 and P2 in the present embodiment). The heating step S3 according to the present embodiment involves carrying out an expanding and melting step S3a and then carrying out a curing step S3b. The expanding and melting step S3a involves heating both of the thermally expandable resin Q and the thermally melting resin P at a temperature within the temperature range in which the thermally expandable resin Q expands and within the temperature range in which the thermally melting resin P melts. The curing step S3b involves heating and curing both of the thermally expandable resin Q and the thermally melting resin P at a temperature within the temperature range in which the thermally expandable resin Q cures and within the temperature range in which the thermally melting resin P cures. In the present embodiment, the heating step S3 involves heating the thermally expandable resin Q and the thermally melting resin P together. In the present embodiment, the melting reaction of the thermally melting resin P and the expanding reaction of the thermally expandable resin Q progress in parallel during the expanding and melting step S3a, and the curing reaction of the thermally melting resin P and the curing reaction of the thermally expandable resin Q progress in parallel during the curing step S3b. The heating step S3 is carried out after the first and second resin disposing steps S21 and S22 are carried out. Thus, carrying out the heating step S3 fixes the coil end portions 32 (which define the coil ends 33) to each other and fixes the insulating members 91 to the coil end portions 32 on both sides in the axial direction L. Although FIG. 20 illustrates, by way of example, the case where the second resin disposing step S22 is carried out after the first resin disposing step S21, the first resin disposing step S21 and the second resin disposing step S22 may be carried out simultaneously, or the first resin disposing step S21 may be carried out after the second resin disposing step S22.

The heating step S3 is carried out, with at least one of the insulating members 91 pressed against the associated coil end portions 32. The at least one of the insulating members 91 is the insulating member 91 that is disposed in the first resin disposing step S21 or the second resin disposing step S22 and then disposed under the core 10. The insulating member 91 disposed under the core 10 will hereinafter be referred to as a "lower insulating member". As illustrated in FIG. 21, the present embodiment involves carrying out the heating step S3, with the core 10 disposed such that the axial direction L is parallel to the vertical direction Z. The present embodiment involves carrying out the heating step S3, with only the lower insulating member (i.e., only the insulating member 91 disposed on the coil end 33 on the second axial side L2 in the present embodiment) pressed against the associated coil end portions 32. This enables, during the heating step S3, the lower insulating member to press, against gravity, the molten thermally melting resin P (i.e., the second thermally melting resin P2 in the present embodiment), which is located between the lower insulating member and the coil end portions 32, against the associated coil end portions 32. Accordingly, the molten thermally melting resin P is also allowed to suitably flow into gaps between the coil end portions 32 that define the coil end 33 for which gravity cannot be used positively to cause the molten thermally melting resin P to flow into gaps between the coil end portions 32 (i.e., the coil end 33 located on the second axial side L2 in the present embodiment). Alternatively, the heating step S3 may be carried out, with both of the insulating members 91 (i.e., the insulating member 91 disposed in the first resin disposing step S21 and the insulating member 91 disposed in the second resin disposing step S22) pressed against the coil end portions 32.

ALTERNATIVE EMBODIMENTS

Armature manufacturing methods and armatures according to alternative embodiments will be described below.

(1) In each of the foregoing embodiments, the resin disposing step S2 has been described, by way of example, as involving disposing the thermally melting resin P such that the thermally melting resin P comes into contact with the coil end portions 32 from locations opposite to the core 10. The resin disposing step S2, however, does not necessarily have to be performed in this manner. In one example, the resin disposing step S2 may involve disposing the thermally melting resin P such that the thermally melting resin P comes into contact with the coil end portions 32 from at least one of the radially inward side R1 and the radially outward side R2. This example is illustrated in FIGS. 23 and 24.

Figure 23:
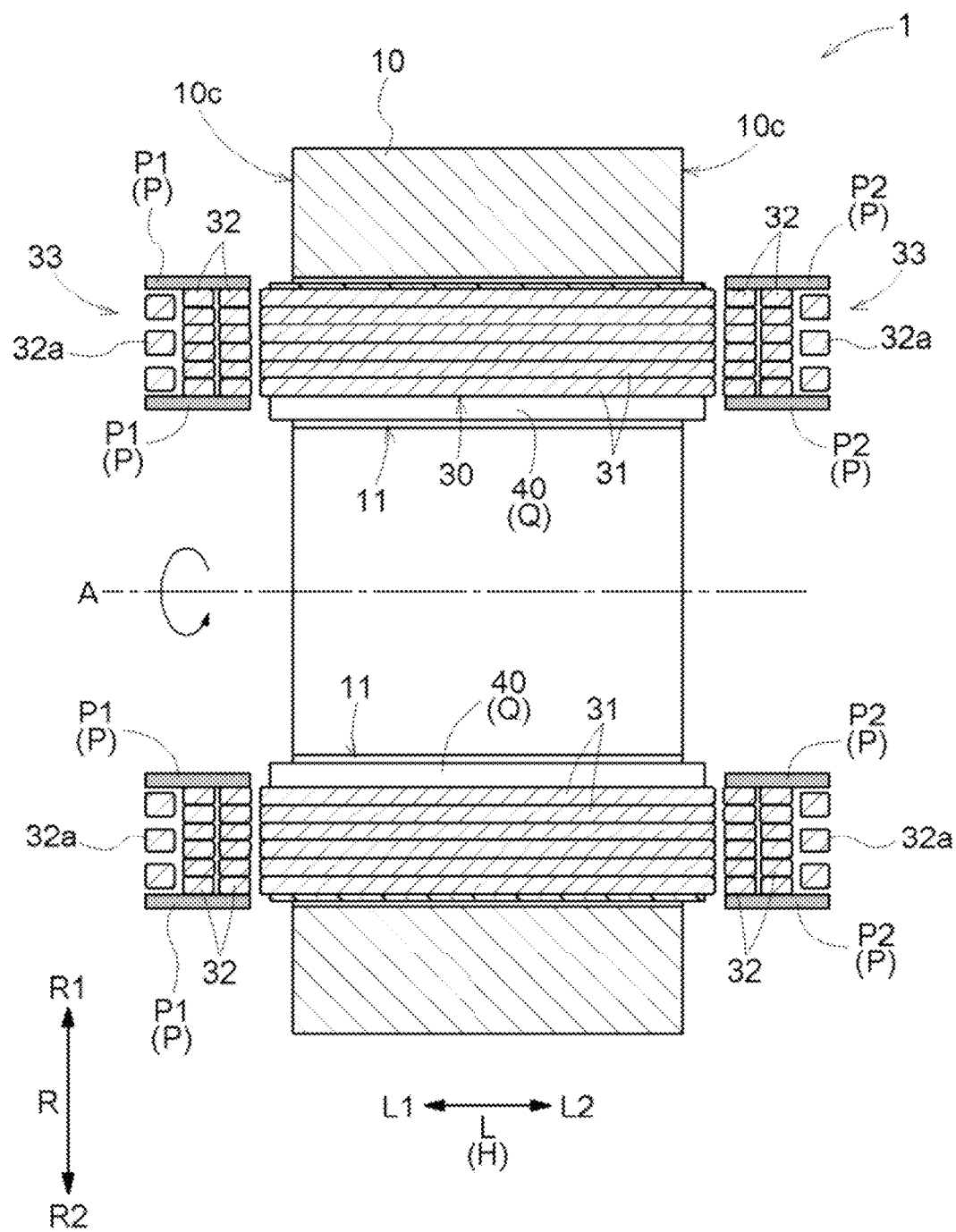
FIG. 23 is a cross-sectional view of an armature taken in an axial direction after a first resin disposing step and a second resin disposing step according to an alternative embodiment are carried out.
Figure 24:
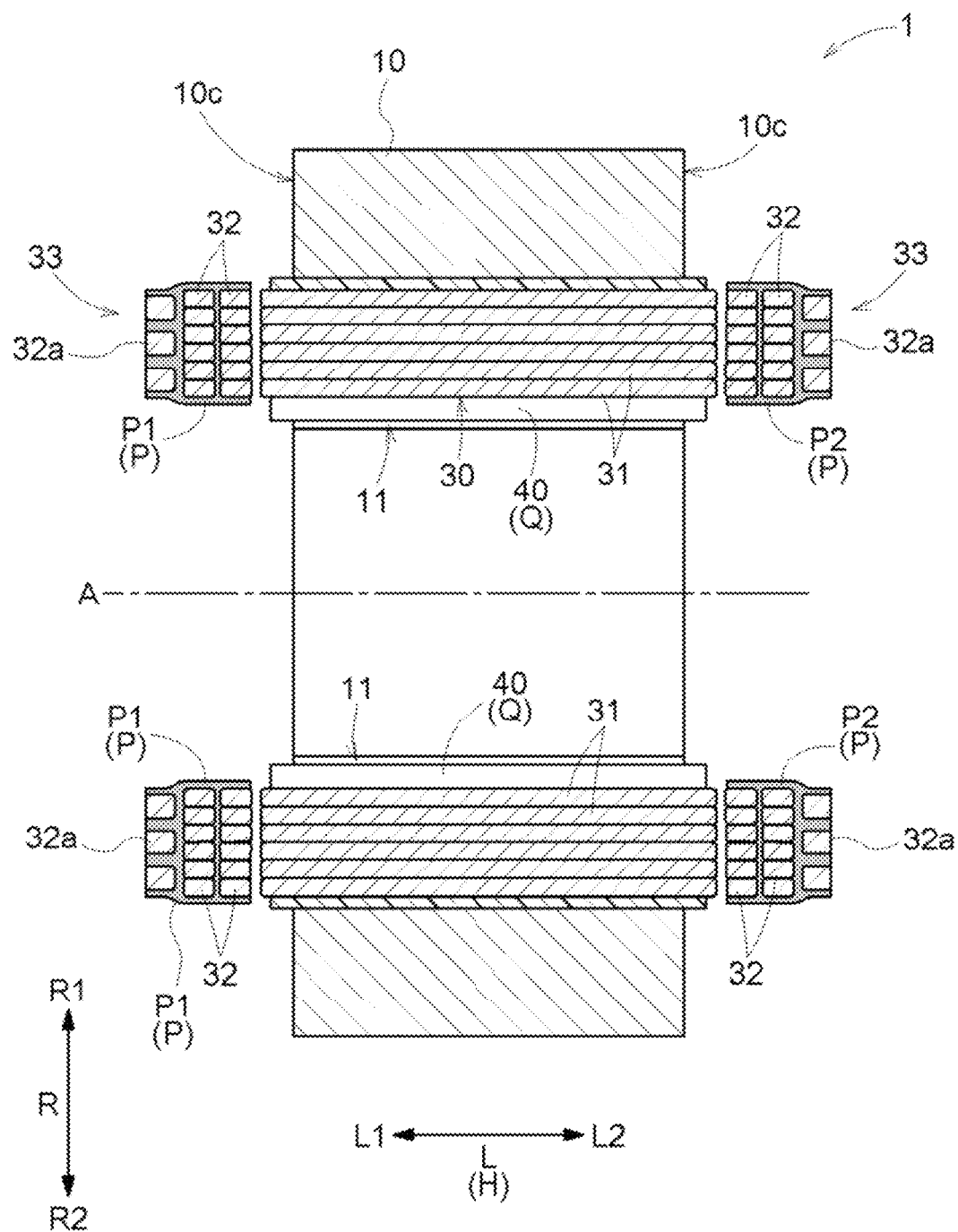
FIG. 24 is a cross-sectional view of the armature taken in the axial direction after a heating step according to the alternative embodiment is carried out.

FIG. 23 illustrates the example where the resin disposing step S2 involves disposing the thermally melting resin P (which includes the first and second thermally melting resins P1 and P2) such that the thermally melting resin P comes into contact with the coil end portions 32 from both of the radially inward side R1 and the radially outward side R2. The first thermally melting resin P1 that comes into contact with the associated coil end portions 32 from the radially inward side R1 and the first thermally melting resin P1 that comes into contact with the associated coil end portions 32 from the radially outward side R2 are disposed on the coil end 33 located on the first axial side L1. The second thermally melting resin P2 that comes into contact with the associated coil end portions 32 from the radially inward side R1 and the second thermally melting resin P2 that comes into contact with the associated coil end portions 32 from the radially outward side R2 are disposed on the coil end 33 located on the second axial side L2. The first and second thermally melting resins P1 and P2 are disposed such that the first and second thermally melting resins P1 and P2 come into contact with the coil end portions 32 (which define the coil ends 33), for example, across the entire region in the circumferential direction C.

The heating step S3 is carried out while the core 10 disposed such that its axis A intersects the vertical direction Z is rotated around the axis A. In the example illustrated in FIG. 23, the heating step S3 is carried out while the core 10 disposed such that the axis A intersects the vertical direction Z at right angles (i.e., such that the axis A is parallel to the horizontal direction H) is rotated around the axis A. With the core 10 supported by, for example, a support mechanism that supports the core 10 from the radially inward side R1, the core 10 is rotated around the axis A by the support mechanism. Carrying out the heating step S3 while rotating the core 10 around the axis A in this manner allows gravity to act on the thermally melting resin P (which is disposed at each predetermined location in the circumferential direction C) in a direction toward the coil end portions 32 for a period of time. This makes it possible to cause, at each predetermined location in the circumferential direction C, the molten thermally melting resin P to suitably flow into gaps between the coil end portions 32 that define the coil ends 33 (see FIG. 24).

(2) The second embodiment has been described, by way of example, as involving carrying out the heating step S3 after the first resin disposing step S21 and the second resin disposing step S22 are carried out. The heating step S3, however, does not necessarily have to be performed in this manner. If the armature 1 including the insulating members 91 is to be manufactured as in the second embodiment, the first resin disposing step S21, the first heating step S31, the second resin disposing step S22, and the second heating step S32 may be carried out in this order as in the first embodiment. Although the insulating members 91 do not need to be pressed against the coil end portions 32 in the first heating step S31 and the second heating step S32 in this case, the insulating member(s) 91 may be pressed against the coil end portions 32 in the first heating step S31 and/or the second heating step S32.

(3) In the second embodiment, the resin disposing step S2 has been described, by way of example, as involving disposing each single-piece structure 90 including the thermally melting resin P and the associated insulating member 91, such that the thermally melting resin P comes into contact with the associated coil end portions 32 from the core-facing location. The resin disposing step S2, however, does not necessarily have to be performed in this manner. Each insulating member 91 may be a component separate from the thermally melting resin P. The resin disposing step S2 may involve disposing the thermally melting resin P such that the thermally melting resin P comes into contact with the coil end portions 32 from the core-facing locations, and disposing the insulating members 91 such that the first portions 91a come into contact with the thermally melting resin P from the core-facing locations.

(4) Each of the foregoing embodiments has been described, by way of example, as involving carrying out the resin disposing step S2 (i.e., both of the first and second resin disposing steps S21 and S22) after the coil disposing step S1. The resin disposing step S2, however, does not necessarily have to be performed in this manner. The resin disposing step S2 may be carried out before the coil disposing step S1. In other words, at least one of the first and second resin disposing steps S21 and S22 (which is the first resin disposing step S21 in this example) may be carried out before the coil disposing step S1. At least one of the first and second resin disposing steps S21 and S22 may be carried out before the coil disposing step S1, for example, when the coil 30 before being disposed in the core 10 is formed into the same shape as the coil 30 disposed in the core 10.

(5) In each of the foregoing embodiments, the coil disposing step S1 has been described, by way of example, as including the partially expanding step S12. The coil disposing step S1, however, does not necessarily have to include the partially expanding step S12. The coil disposing step S1 may include no partially expanding step S12. When the sheet member disposing step S11 involves, for example, disposing the insulating sheets 40 in the core 10 such that the protruded portions 60 are provided with cuff portions, the cuff portions are able to suppress the insulating sheets 40 from coming out of the slots 11. This allows the coil disposing step S1 to include no partially expanding step S12. When the coil disposing step S1 includes no partially expanding step S12 as just described, the sheet member disposing step S11 may involve, instead of disposing the pre-expansion insulating sheets 40 in the core 10, disposing the pre-expansion insulating sheets 40 around the slot-housed portions 31 before being disposed inside the slots 11, and the slot-housed portion disposing step S13 may involve disposing the slot-housed portions 31 inside the slots 11 together with the insulating sheets 40 disposed around the slot-housed portions 31.

(6) Each of the foregoing embodiments has been described, by way of example, as involving using, as the thermally expandable resin Q, the sheet members (the insulating sheets 40) each formed into a sheet. The thermally expandable resin Q, however, may be of any other type. The thermally expandable resin Q may be, for example, of a type to be applied to a target region. In this case, the coil disposing step S1 may involve applying the pre-expansion thermally expandable resin Q, for example, to the inner surfaces 20 of the slots 11, and then disposing the slot-housed portions 31 inside the slots 11. Alternatively, the coil disposing step S1 may involve applying the pre-expansion thermally expandable resin Q, for example, to the outer surfaces of the slot-housed portions 31, and then disposing the slot-housed portions 31 inside the slots 11. In either case, carrying out the coil disposing step S1 disposes the coil 30 in the core 10 such that the pre-expansion thermally expandable resin Q is disposed between the slot-housed portions 31 and the inner surfaces 20 of the slots 11.

(7) In each of the foregoing embodiments, the heating step (which is the first heating step S31 according to the first embodiment or the heating step S3 according to the second embodiment) has been described, by way of example, as including the step of heating both of the thermally expandable resin Q and the thermally melting resin P at a temperature within the temperature range in which the thermally expandable resin Q expands and within the temperature range in which the thermally melting resin P melts (i.e., the expanding and melting step S31a according to the first embodiment or the expanding and melting step S3a according to the second embodiment). The heating step, however, does not necessarily have to include the step just described. For example, when the temperature range in which the thermally expandable resin Q expands does not overlap with the temperature range in which the thermally melting resin P melts, the heating step may include: an expanding step involving heating the thermally expandable resin Q at a temperature within the temperature range in which the thermally expandable resin Q expands; and a melting step involving heating the thermally melting resin P at a temperature within the temperature range in which the thermally melting resin P melts. The heating step may involve carrying out one of the expanding step and the melting step and then carrying out the other of the expanding step and the melting step. In this case, the expanding step and the melting step may be carried out continuously, for example, in the course of raising the temperature by application of heat.

(8) In each of the foregoing embodiments, the heating step (which is the first heating step S31 according to the first embodiment or the heating step S3 according to the second embodiment) has been described, by way of example, as including the step of heating and curing both of the thermally expandable resin Q and the thermally melting resin P at a temperature within the temperature range in which the thermally expandable resin Q cures and within the temperature range in which the thermally melting resin P cures (i.e., the first curing step S31*b* according to the first embodiment or the curing step S3*b* according to the second embodiment). The heating step, however, does not necessarily have to include the step just described. For example, when the temperature range in which the thermally expandable resin Q cures does not overlap with the temperature range in which the thermally melting resin P cures, the heating step may include: a curing step involving heating and curing the thermally expandable resin Q at a temperature within the temperature range in which the thermally expandable resin Q cures; and a curing step involving heating and curing the thermally melting resin P at a temperature within the temperature range in which the thermally melting resin P cures. The heating step may involve carrying out one of the two curing steps and then carrying out the other of the two curing steps.

(9) The present disclosure may include any combination of the features of the foregoing embodiments and the features of the alternative embodiments and any combination of the features of the alternative embodiments as long as no contradiction arises. The features of the embodiments disclosed herein are merely illustrative in all respects. Accordingly, various suitable modifications may be made without departing from the scope and spirit of the present disclosure.

Summary of Foregoing Embodiments

The armature manufacturing methods and the armatures illustrated above will be described in summary below.

An armature manufacturing method is a method for manufacturing an armature (1) including: a core (10) that includes a slot (11); and a coil (30) that includes a slot-housed portion (31) disposed inside the slot (11) and coil end portions (32) disposed outside the slot (11). The method includes: a coil disposing step (S1) involving using a thermally expandable resin (Q) that expands by application of heat, and disposing the coil (30) in the core (10) such that the thermally expandable resin (Q) before expansion is disposed between the slot-housed portion (31) and an inner surface (20) of the slot (11); a resin disposing step (S2) involving, before or after the coil disposing step (S1), using a thermally melting resin (P) that melts by application of heat, and disposing the thermally melting resin (P) before melting such that the thermally melting resin (P) comes into contact with the coil end portions (32); and a heating step (S3, S31) involving, after the coil disposing step (S1) and the resin disposing step (S2), heating, expanding, and then curing the thermally expandable resin (Q), and heating, melting, and then curing the thermally melting resin (P).

The method involves performing the heating step (S3, S31) so as to expand the pre-expansion thermally expandable resin (Q) disposed between the slot-housed portion (31) and the inner surface (20) of the slot (11) and then cure the thermally expandable resin (Q). This makes it possible to fix the slot-housed portion (31) to the inner surface (20) of the slot (11) with the thermally expandable resin (Q) that has expanded (that has cured after expansion). The method involves performing the heating step (S3, S31) so as to melt the pre-melting thermally melting resin (P) disposed in contact with the coil end portions (32) and then cure the thermally melting resin (P). This makes it possible to cause the molten thermally melting resin (P) to flow into gaps between the coil end portions (32) that define a coil end (33). The coil end portions (32) are thus fixable to each other with the thermally melting resin (P) that has molten (that has cured after melting). In other words, performing the heating step (S3, S31) makes it possible to not only fix the slot-housed portion (31) to the core (10) but also fix the coil end portions (32), which define the coil end (33), to each other.

The above-described method is thus able to, with a relatively simple step, not only fix the slot-housed portion (31) to the core (10) but also fix the coil end portions (32), which define the coil end (33), to each other.

The heating step (S3, S31) preferably involves heating the thermally expandable resin (Q) and the thermally melting resin (P) together.

Thus, the time required for the heating step (S3, S31) will be shorter than when the heating step (S3, S31) involves heating the thermally expandable resin (Q) and the thermally melting resin (P) separately. Using the same device in heating the thermally expandable resin (Q) and heating the thermally melting resin (P) results in a reduction in equipment cost.

The thermally expandable resin (Q) is preferably a resin that softens and then expands by application of heat. A temperature at which the thermally melting resin (P) starts melting is preferably higher than a temperature at which the thermally expandable resin (Q) starts softening.

Thus, a melting reaction of the thermally melting resin (P) and an expanding reaction of the thermally expandable resin (Q) are allowed to progress in parallel during the heating step (S3, S31). Accordingly, a curing reaction of the thermally melting resin (P) that occurs after the melting reaction and a curing reaction of the thermally expandable resin (Q) that occurs after the expanding reaction are allowed to progress in parallel. Consequently, the step of curing the thermally expandable resin (Q), which requires a relatively long time, and the step of curing the thermally melting resin (P), which requires a relatively long time, are performed in the same step (S3*b*, S31*b*), resulting in a reduction in the time required for the heating step (S3, S31).

Both of the thermally expandable resin (Q) and the thermally melting resin (P) preferably include a thermosetting resin. The heating step (S3, S31) preferably includes a step (S3*b*, S31*b*) of heating and curing both of the thermally expandable resin (Q) and the thermally melting resin (P) at a temperature within a temperature range in which the thermally expandable resin (Q) cures and within a temperature range in which the thermally melting resin (P) cures.

Thus, the curing step that requires a relatively long time in the course of expanding and curing the thermally expandable resin (Q) and the curing step that requires a relatively long time in the course of melting and curing the thermally melting resin (P) are allowed to be performed in the same step (S3*b*, S31*b*). Accordingly, the time required for the heating step (S3, S31) will be shorter than when the two curing steps are performed at different times.

The heating step (S3, S31) preferably includes a step (S3*a*, S31*a*) of heating both of the thermally expandable resin (Q) and the thermally melting resin (P) at a temperature within a temperature range in which the thermally expandable resin (Q) expands and within a temperature range in which the thermally melting resin (P) melts.

Thus, the expanding step to expand the thermally expandable resin (Q) and the melting step to melt the thermally melting resin (P) are allowed to be performed in the same step (S3*a*, S31*a*). Accordingly, the time required for the heating step (S3, S31) will be shorter than when the expanding step and the melting step are performed at different times.

The armature (1) preferably includes an insulating member (91) that is an electrically insulating member higher in melting point than the thermally melting resin (P). The insulating member (91) preferably includes a body (91a) that covers the coil end portions (32) from a core-facing location opposite to the core (10). The resin disposing step (S2) preferably involves disposing a single-piece structure (90) such that the thermally melting resin (P) comes into contact with the coil end portions (32) from the core-facing location, the single-piece structure (90) including the thermally melting resin (P) and the insulating member (91) integral with each other such that the body (91a) is fixed to a surface of the thermally melting resin (P) located opposite to its surface in contact with the coil end portions (32), or preferably involves disposing the thermally melting resin (P) such that the thermally melting resin (P) comes into contact with the coil end portions (32) from the core-facing location and disposing the insulating member (91) such that the body (91a) comes into contact with the thermally melting resin (P) from the core-facing location.

Thus, carrying out the heating step (S3, S31) makes it possible to fix the body (91a) of the insulating member (91) to the coil end portions (32) with the molten thermally melting resin (P). Accordingly, when the armature (1) including the insulating member (91) is to be manufactured, the step of fixing the insulating member (91) to the armature (1) is included in the heating step (S3, S31), resulting in a reduction in the number of manufacturing steps. The armature (1) including the insulating member (91) is advantageous in that necessary insulation distances between the coil end portions (32) and other members (such as an inner surface of a case) will be shorter than those in the armature (1) including no insulating member (91).

The core (10) is preferably formed into a cylindrical shape such that a plurality of the slots (11) including openings (12) defined in both ends of the core (10) in an axial direction (L) is arranged in a circumferential direction (C). The coil disposing step (S1) preferably involves disposing the coil (30) in the core (10) such that the coil end portions (32) protrude outward in the axial direction (L) through the openings (12) on both sides in the axial direction (L). The resin disposing step (S2) preferably includes: a first resin disposing step (S21) that is targeted for the coil end portions (32) located on a first side in the axial direction (L) and that involves disposing the insulating member (91) on the first side in the axial direction (L); and a second resin disposing step (S22) that is targeted for the coil end portions (32) located on a second side in the axial direction (L); and that involves disposing the insulating member (91) on the second side in the axial direction (L). The heating step (S3) is preferably carried out after the first resin disposing step (S21) and the second resin disposing step (S22) are carried out. The heating step (S3) is preferably carried out, with at least one of the insulating members (91) pressed against the coil end portions (32). The at least one of the insulating members (91) is preferably the insulating member (91) that is disposed in the first resin disposing step (S21) or the second resin disposing step (S22) and then disposed under the core (10).

Thus, carrying out the heating step (S3) makes it possible to fix the coil end portions (32), which define the coil ends (33), to each other on both sides in the axial direction (L), because the heating step (S3) is carried out after the first resin disposing step (S21) and the second resin disposing step (S22) are carried out. Accordingly, manufacturing time will be shorter than when the coil end portions (32) are fixed to each other on only one side in the axial direction (L) by carrying out the heating step (S3).

As described above, the heating step (S3) is carried out, with at least one of the insulating members (91) pressed against the coil end portions (32). The at least one of the insulating members (91) is the insulating member (91) that is disposed in the first resin disposing step (S21) or the second resin disposing step (S22) and then disposed under the core (10). The insulating member (91) disposed under the core (10) will hereinafter be referred to as a "lower insulating member". This enables, during the heating step (S3), the lower insulating member to press, against gravity, the molten thermally melting resin (P), which is located between the lower insulating member and the coil end portions (32), against the coil end portions (32). Accordingly, the molten thermally melting resin (P) is also allowed to suitably flow into gaps between the coil end portions (32) that define the coil end (33) for which gravity cannot be used positively to cause the molten thermally melting resin (P) to flow into gaps between the coil end portions (32). Consequently, irrespective of the orientation of the coil ends (33) in a vertical direction (Z), the coil end portions (32) that define the coil ends (33) are suitably fixable to each other with the molten thermally melting resin (P).

The core (10) is preferably formed into a cylindrical shape such that a plurality of the slots (11) including openings (12) defined in both ends of the core (10) in an axial direction (L) is arranged in a circumferential direction (C). The coil disposing step (S1) preferably involves disposing the coil (30) in the core (10) such that the coil end portions (32) protrude outward in the axial direction (L) through the openings (12) on both sides in the axial direction (L). The resin disposing step (S2) preferably involves disposing the thermally melting resin (P) such that the thermally melting resin (P) comes into contact with the coil end portions (32) from locations opposite to the core (10). The resin disposing step (S2) preferably includes: a first resin disposing step (S21) that is targeted for the coil end portions (32) located on a first side in the axial direction (L) and that involves disposing a first thermally melting resin (P1) included in the thermally melting resin (P); and a second resin disposing step (S22) that is targeted for the coil end portions (32) located on a second side in the axial direction (L) and that involves disposing a second thermally melting resin (P2) included in the thermally melting resin (P). The heating step (S31) is preferably carried out after the first resin disposing step (S21) is carried out. The heating step (S31) is preferably carried out, with the first thermally melting resin (P1) disposed above the core (10). The second resin disposing step (S22) is preferably carried out after the heating step (S31) is carried out. The second thermally melting resin (P2) is preferably heated and molten, with the second thermally melting resin (P2) disposed above the core (10) after the second resin disposing step (S22) is carried out.

Thus, carrying out the heating step (S31) causes the molten first thermally melting resin (P1) to flow by gravity into gaps between the coil end portions (32) that define the coil end (33) located on the first side in the axial direction (L), making it possible to fix the coil end portions (32) to each other with the molten first thermally melting resin (P1). Carrying out the step (S32) of heating and melting the second thermally melting resin (P2) causes the molten second thermally melting resin (P2) to flow by gravity into gaps between the coil end portions (32) that define the coil end (33) located on the second side in the axial direction (L), making it possible to fix the coil end portions (32) to each other with the molten second thermally melting resin (P2).

As described above, the molten thermally melting resin (P) is thus allowed to flow by gravity into gaps between the coil end portions (32) that define the coil ends (33) located on both sides in the axial direction (L). Consequently, the coil end portions (32) that define the coil ends (33) are suitably fixable to each other with the molten thermally melting resin (P) on both sides in the axial direction (L).

The core (10) is preferably formed into a cylindrical shape such that a plurality of the slots (11) including openings (12) defined in both ends of the core (10) in an axial direction (L) is arranged in a circumferential direction (C). The coil disposing step (S1) preferably involves disposing the coil (30) in the core (10) such that the coil end portions (32) protrude outward in the axial direction (L) through the openings (12) on both sides in the axial direction (L). The resin disposing step (S2) preferably involves disposing the thermally melting resin (P) such that the thermally melting resin (P) comes into contact with the coil end portions (32) from at least one of a radially inward side (R1) and a radially outward side (R2). The heating step (S3) is preferably carried out while the core (10) disposed such that its axis (A) intersects a vertical direction (Z) is rotated around the axis (A).

Thus, gravity is allowed to act on the thermally melting resin P (which is disposed at each predetermined location in the circumferential direction C) in a direction toward the coil end portions (32) for a period of time, because the core (10) is rotated around the axis (A) during the heating step (S3). This makes it possible to cause, at each predetermined location in the circumferential direction (C), the molten thermally melting resin (P) to suitably flow into gaps between the coil end portions (32) that define the coil ends (33). Consequently, the coil end portions (32) that define the coil ends (33) are suitably fixable to each other across the entire regions thereof in the circumferential direction (C) with the molten thermally melting resin (P).

A sheet member (40) formed into a sheet is preferably used as the thermally expandable resin (Q). The coil disposing step (S1) preferably includes: a sheet member disposing step (S11) involving disposing the sheet member (40) before expansion in the core (10) such that the sheet member (40) is provided with an intra-slot portion (50) disposed along the inner surface (20) of the slot (11) and a protruded portion (60) protruding out of the slot (11) through an opening (12) of the slot (11); a partially expanding step (S12) involving, after the sheet member disposing step (S11), heating and expanding a target region (44) of the sheet member (40) extending along an opening edge (13) of the opening (12); and a slot-housed portion disposing step (S13) involving, after the partially expanding step (S12), disposing the slot-housed portion (31) inside the slot (11) such that the intra-slot portion (50) is disposed between the slot-housed portion (31) and the inner surface (20) of the slot (11).

Thus, the partially expanding step (S12) is carried out between the sheet member disposing step (S11) and the slot-housed portion disposing step (S13). The partially expanding step (S12) involves expanding the target region (44) of the sheet member (40) extending along the opening edge (13) of the opening (12) of the slot (11). Accordingly, carrying out the partially expanding step (S12) forms a step (46) on the sheet member (40) such that the step (46) comes into contact with an opening end face (10c) that is an end face of the core (10) defined around the opening edge (13). This makes it possible to, with a frictional force or an adhesive force exerted between the step (46) and the opening end face (10c), restrict the sheet member (40) from moving relative to the core (10) in carrying out the slot-housed portion disposing step (S13) after the partially expanding step (S12).

As described above, the slot-housed portion disposing step (S13) is thus carried out while the sheet member (40) is restricted from moving relative to the core (10). This facilitates disposing the coil (30) in the core (10) such that the intra-slot portion (50) of the sheet member (40) is disposed between the slot-housed portion (31) and the inner surface (20) of the slot (11) in carrying out the slot-housed portion disposing step (S13).

The coil (30) is preferably provided by connecting a plurality of linear conductors (3) outside the slot (11). The resin disposing step (S2) preferably involves disposing the thermally melting resin (P) before melting such that the thermally melting resin (P) comes into contact with a connection (4) between the linear conductors (3) that define the coil end portions (32).

Thus, melting the pre-melting thermally melting resin (P) and then curing the thermally melting resin (P) by performing the heating step (S3, S31) makes it possible to not only fix the coil end portions (32) to each other with the molten thermally melting resin (P) but also cover the connection (4) with the molten thermally melting resin (P) so as to provide electric insulation for the connection (4). Accordingly, the step of providing electric insulation for the connection (4) is included in the heating step (S3, S31), resulting in a reduction in the number of manufacturing steps.

The coil (30) is preferably provided by using a linear conductor (3) having a rectangular shape in a cross section perpendicular to a direction of extension. A plurality of the slot-housed portions (31) is preferably aligned in a row or rows inside the slot (11). The coil end portions (32) are preferably disposed such that each of the coil end portions (32) and the other coil end portion (32) adjacent thereto in an arrangement direction (C) of a plurality of the slots (11) in the core (10) partially overlap with each other in the arrangement direction (C).

When the coil end portions (32) are disposed in the above-described manner, gaps between the coil end portions (32) that define the coil end (33) are likely to be narrow, which may make it difficult for the molten resin to flow into the slots (11) from outside the coil end (33). In this respect, the technique according to the present disclosure makes it possible to fix the slot-housed portions (31) to the core (10) with the thermally expandable resin (Q) disposed between the slot-housed portions (31) and the inner surfaces (20) of the slots (11) without the need to flow the molten resin into the slots (11) from outside the coil end (33). Thus, the slot-housed portions (31) each having a rectangular cross-sectional shape are aligned inside each slot (11), so that spaces inside the slots (11) are more likely to be smaller than when the slot-housed portions (31) are provided by thin wires (thin round wires). This makes it possible to suitably fix the slot-housed portions (31) with the thermally expandable resin (Q). Consequently, the technique according to the present disclosure is particularly suitable for the case where the coil (30) is provided using the linear conductors (3) each having a rectangular shape in a cross section perpendicular to the direction of extension and the slot-housed portions (31) and the coil end portions (32) are disposed in the above-described manner.

An armature (1) includes: a core (10) that includes a slot (11); and a coil (30) that includes a slot-housed portion (31) disposed inside the slot (11) and coil end portions (32) disposed outside the slot (11). A thermally expandable resin (Q) that expands by application of heat is disposed between the slot-housed portion (31) and an inner surface of the slot (11), with the thermally expandable resin (Q) cured after expansion. A thermally melting resin (P) that melts by application of heat is disposed in a gap between the coil end portions (32), with the thermally melting resin (P) cured after melting.

In this arrangement, the slot-housed portion (31) is fixed to the core (10), and in addition, the coil end portions (32) that define a coil end (33) are fixed to each other. This makes it possible to provide the armature (1) that is able to reduce vibrations of the coil end (33).

In the above arrangement, each of the thermally expandable resin (Q) to fix the slot-housed portion (31) to the core (10) and the thermally melting resin (P) to fix the coil end portions (32) to each other may be a resin whose reaction until curing progresses by application of heat. This makes it possible to perform both of the step of fixing the slot-housed portion (31) to the core (10) and the step of fixing the coil end portions (32) to each other in the same step, i.e., the heating step (S3, S31), in the course of manufacture of the armature (1). Consequently, the armature (1) is manufacturable by fixing the slot-housed portion (31) to the core (10) and fixing the coil end portions (32), which define the coil end (33), to each other by a relatively simple step.

The armature (1) preferably includes an electrically insulating member (91) higher in melting point than the thermally melting resin (P). The insulating member (91) preferably includes a body (91a) that covers the coil end portions (32) from a core-facing location opposite to the core (10). The body (91a) is preferably fixed to the coil end portions (32) with the thermally melting resin (P).

In this arrangement, necessary insulation distances between the coil end portions (32) and other members (such as an inner surface of a case) will be shorter than those in the armature (1) including no insulating member (91).

In the above arrangement, the insulating member (91) is fixed to the coil end portions (32) with the thermally melting resin (P) to fix the coil end portions (32) to each other. Accordingly, in the course of manufacture of the armature (1), the step of fixing the insulating member (91) to the armature (1) is included in the heating step (S3, S31), resulting in a reduction in the number of manufacturing steps.

The thermally expandable resin (Q) preferably includes: an intra-slot portion (50) disposed along the inner surface of the slot (11); a protruded portion (60) protruding out of the slot (11) through an opening (12) of the slot (11); and a recess (45) defined along an opening edge (13) of the opening (12) and recessed away from the opening edge (13).

In this arrangement, the recess (45) will be caught on the opening edge (13) so as to restrict movement of the thermally expandable resin (Q) relative to the core (10), which is caused by, for example, vibrations. Accordingly, if the protruded portion (60) is provided with no folded portion, the thermally expandable resin (Q) would be restricted from moving relative to the core (10).

The coil (30) is preferably provided by connecting a plurality of linear conductors (3) outside the slot (11). A connection (4) between the linear conductors (3) that define the coil end portions (32) is preferably covered with the thermally melting resin (P).

In this arrangement, using the thermally melting resin (P) to fix the coil end portions (32) to each other makes it possible to provide electric insulation for the connection (4), resulting in a reduction in manufacturing cost.

The coil (30) is preferably provided by using a linear conductor (3) having a rectangular shape in a cross section perpendicular to a direction of extension. A plurality of the slot-housed portions (31) is preferably aligned in a row or rows inside the slot (11). The coil end portions (32) are preferably disposed such that each of the coil end portions (32) and the other coil end portion (32) adjacent thereto in an arrangement direction (C) of a plurality of the slots (11) in the core (10) partially overlap with each other in the arrangement direction (C).

In this arrangement, the slot-housed portions (31) each having a rectangular cross-sectional shape are aligned inside each slot (11). Accordingly, spaces inside the slots (11) are more likely to be smaller than when the slot-housed portions (31) are provided by thin wires (thin round wires). This makes it possible to suitably fix the slot-housed portions (31) with the thermally expandable resin (Q).

When the coil end portions (32) are disposed in the above-described manner, gaps between the coil end portions (32) that define the coil end (33) are likely to be narrow, which may make it difficult for the molten resin to flow into the slots (11) from outside the coil end (33). In this respect, the technique according to the present disclosure uses, as a resin to fix the slot-housed portions (31) to the core (10), the thermally expandable resin (Q) instead of the thermally melting resin (P). This makes it possible to fix the slot-housed portions (31) to the core (10) with the thermally expandable resin (Q) disposed between the slot-housed portions (31) and the inner surfaces (20) of the slots (11) without the need to flow the molten resin into the slots (11) from outside the coil end (33). Consequently, the technique according to the present disclosure is particularly suitable for the case where the coil (30) is provided using the linear conductors (3) each having a rectangular shape in a cross section perpendicular to the direction of extension and the slot-housed portions (31) and the coil end portions (32) are disposed in the above-described manner.

The armature manufacturing methods and the armatures according to the present disclosure may each achieve at least one of the effects described above.

DESCRIPTION OF THE REFERENCE NUMERALS 1 armature
3 linear conductor
4 connection
10 core
11 slot
12 axial opening (opening)
13 opening edge
20 inner surface
30 coil
31 slot-housed portion
32 coil end portion
40 insulating sheet (sheet member)
44 target region
45 recess
50 intra-slot portion
60 protruded portion
90 single-piece structure
91 insulating member
91a first portion (body)
S1 coil disposing step
S11 sheet member disposing step
S12 partially expanding step
S13 slot-housed portion disposing step S2 resin disposing step
S21 first resin disposing step
S22 second resin disposing step
S3 heating step
S31 first heating step (heating step)
A axis
C circumferential direction (arrangement direction)
L axial direction
P thermally melting resin
P1 first thermally melting resin
P2 second thermally melting resin
Q thermally expandable resin
R1 radially inward side
R2 radially outward side
Z vertical direction

The invention claimed is:

1. An armature manufacturing method for manufacturing an armature including
a core that includes a slot, and
a coil that includes a slot-housed portion disposed inside the slot and coil end portions disposed outside the slot, the method comprising:
a coil disposing step involving using a thermally expandable resin that expands by application of heat, and disposing the coil in the core such that the thermally expandable resin before expansion is disposed between the slot-housed portion and an inner surface of the slot;
a resin disposing step involving, before or after the coil disposing step, using a thermally melting resin that melts by application of heat, and disposing the thermally melting resin before melting such that the thermally melting resin comes into contact with the coil end portions; and
a heating step involving, after the coil disposing step and the resin disposing step, heating, expanding, and then curing the thermally expandable resin, and, after the coil disposing step and the resin disposing step, heating, melting, and then curing the thermally melting resin.

2. The armature manufacturing method according to claim 1, wherein
the heating step involves heating the thermally expandable resin and the thermally melting resin together.

3. The armature manufacturing method according to claim 1, wherein
the thermally expandable resin is a resin that softens and then expands by application of heat, and
a temperature at which the thermally melting resin starts melting is higher than a temperature at which the thermally expandable resin starts softening.

4. The armature manufacturing method according to claim 1, wherein
both of the thermally expandable resin and the thermally melting resin include a thermosetting resin, and
the heating step includes a step of heating and curing both of the thermally expandable resin and the thermally melting resin at a temperature within a temperature range in which the thermally expandable resin cures and within a temperature range in which the thermally melting resin cures.

5. The armature manufacturing method according to claim 1, wherein
the heating step includes a step of heating both of the thermally expandable resin and the thermally melting resin at a temperature within a temperature range in which the thermally expandable resin expands and within a temperature range in which the thermally melting resin melts.

6. The armature manufacturing method according to claim 1, wherein
the armature includes an electrically insulating member higher in melting point than the thermally melting resin,
the insulating member includes a body that covers the coil end portions from a core-facing location opposite to the core, and
the resin disposing step involves disposing a single-piece structure such that the thermally melting resin comes into contact with the coil end portions from the core-facing location, the single-piece structure including the thermally melting resin and the insulating member integral with each other such that the body is fixed to a surface of the thermally melting resin located opposite to a surface of the thermally melting resin in contact with the coil end portions, or involves disposing the thermally melting resin such that the thermally melting resin comes into contact with the coil end portions from the core-facing location and disposing the insulating member such that the body comes into contact with the thermally melting resin from the core-facing location.

7. The armature manufacturing method according to claim 6, wherein
the core is formed into a cylindrical shape such that a plurality of the slots including openings defined in both ends of the core in an axial direction is arranged in a circumferential direction,
the coil disposing step involves disposing the coil in the core such that the coil end portions protrude outward in the axial direction through the openings on both sides in the axial direction,
the resin disposing step includes
a first resin disposing step that is targeted for the coil end portions located on a first side in the axial direction and that involves disposing the insulating member on the first side in the axial direction, and
a second resin disposing step that is targeted for the coil end portions located on a second side in the axial direction and that involves disposing the insulating member on the second side in the axial direction,
the heating step is carried out after the first resin disposing step and the second resin disposing step are carried out, and
the heating step is carried out, with at least one of the insulating members pressed against the coil end portions, the at least one of the insulating members being the insulating member that is disposed in the first resin disposing step or the second resin disposing step and then disposed under the core.

8. The armature manufacturing method according to claim 1, wherein
the core is formed into a cylindrical shape such that a plurality of the slots including openings defined in both ends of the core in an axial direction is arranged in a circumferential direction,
the coil disposing step involves disposing the coil in the core such that the coil end portions protrude outward in the axial direction through the openings on both sides in the axial direction,
the resin disposing step involves disposing the thermally melting resin such that the thermally melting resin comes into contact with the coil end portions from locations opposite to the core, the resin disposing step includes
- a first resin disposing step that is targeted for the coil end portions located on a first side in the axial direction and that involves disposing a first thermally melting resin included in the thermally melting resin, and
- a second resin disposing step that is targeted for the coil end portions located on a second side in the axial direction and that involves disposing a second thermally melting resin included in the thermally melting resin, the heating step is carried out after the first resin disposing step is carried out, the heating step is carried out, with the first thermally melting resin disposed above the core, the second resin disposing step is carried out after the heating step is carried out, and the second thermally melting resin is heated and molten, with the second thermally melting resin disposed above the core after the second resin disposing step is carried out.

9. The armature manufacturing method according to claim 1, wherein the core is formed into a cylindrical shape such that a plurality of the slots including openings defined in both ends of the core in an axial direction is arranged in a circumferential direction, the coil disposing step involves disposing the coil in the core such that the coil end portions protrude outward in the axial direction through the openings on both sides in the axial direction, the resin disposing step involves disposing the thermally melting resin such that the thermally melting resin comes into contact with the coil end portions from at least one of a radially inward side and a radially outward side, and the heating step is carried out while the core disposed such that an axis of the core intersects a vertical direction is rotated around the axis.

10. The armature manufacturing method according to claim 1, wherein
- a sheet member formed into a sheet is used as the thermally expandable resin, and
- the coil disposing step includes
  - a sheet member disposing step involving disposing the sheet member before expansion in the core such that the sheet member is provided with an intra-slot portion disposed along the inner surface of the slot and a protruded portion protruding out of the slot through an opening of the slot,
  - a partially expanding step involving, after the sheet member disposing step, heating and expanding a target region of the sheet member extending along an opening edge of the opening, and
  - a slot-housed portion disposing step involving, after the partially expanding step, disposing the slot-housed portion inside the slot such that the intra-slot portion is disposed between the slot-housed portion and the inner surface of the slot.

11. The armature manufacturing method according to claim 1, wherein the coil is provided by connecting a plurality of linear conductors outside the slot, and the resin disposing step involves disposing the thermally melting resin before melting such that the thermally melting resin comes into contact with a connection between the linear conductors that define the coil end portions.

12. The armature manufacturing method according to claim 1, wherein the coil is provided by using a linear conductor having a rectangular shape in a cross section perpendicular to a direction of extension, a plurality of the slot-housed portions is aligned in a row or rows inside the slot, and the coil end portions are disposed such that each of the coil end portions and the other coil end portion adjacent to the coil end portion in an arrangement direction of a plurality of the slots in the core partially overlap with each other in the arrangement direction.

13. An armature comprising:

a core that includes a slot; and a coil that includes a slot-housed portion disposed inside the slot, and coil end portions disposed outside the slot, wherein a thermally expandable resin that expands by application of heat is disposed between the slot-housed portion and an inner surface of the slot, with the thermally expandable resin cured after expansion, and a thermally melting resin that melts by application of heat is disposed in a gap between the coil end portions, with the thermally melting resin cured after melting, wherein the armature includes an electrically insulating member higher in melting point than the thermally melting resin.

14. The armature according to claim 13, wherein the insulating member includes a body that covers the coil end portions from a core-facing location opposite to the core, and the body is fixed to the coil end portions with the thermally melting resin.

15. The armature according to claim 13, wherein the thermally expandable resin includes
- an intra-slot portion disposed along the inner surface of the slot,
- a protruded portion protruding out of the slot through an opening of the slot, and
- a recess defined along an opening edge of the opening and recessed away from the opening edge.

16. The armature according to claim 13, wherein the coil is provided by connecting a plurality of linear conductors outside the slot, and a connection between the linear conductors that define the coil end portions is covered with the thermally melting resin.

17. The armature according to claim 13, wherein the coil is provided by using a linear conductor having a rectangular shape in a cross section perpendicular to a direction of extension, a plurality of the slot-housed portions is aligned in a row or rows inside the slot, and the coil end portions are disposed such that each of the coil end portions and the other coil end portion adjacent to the coil end portion in an arrangement direction of a plurality of the slots in the core partially overlap with each other in the arrangement direction.

* * * * *